United States Patent [19]

Claasen et al.

[11] Patent Number: 4,672,633

[45] Date of Patent: Jun. 9, 1987

[54] DATA TRANSMISSION SYSTEM

[75] Inventors: Theodoor A. C. M. Claasen; Gerardus F. M. Beenker; Petrus J. Van Gerwen; Johannes M. Meijer; Martinus L. N. Didden, all of Eindhoven, Netherlands

[73] Assignee: U.S. Philips Corporation, New York, N.Y.

[21] Appl. No.: 705,779

[22] Filed: Feb. 26, 1985

[30] Foreign Application Priority Data

Mar. 2, 1984 [NL] Netherlands .......................... 8400676

[51] Int. Cl.⁴ ............................................. H04L 25/34
[52] U.S. Cl. ........................................ 375/58; 375/18; 375/39; 375/60; 375/103
[58] Field of Search .................. 364/724, 825; 375/11, 375/12, 18, 101, 39, 58, 60, 103; 333/18, 20, 28

[56]  References Cited

U.S. PATENT DOCUMENTS

| 3,781,873 | 12/1973 | Nussbaumer | 375/18 |
| 4,066,878 | 1/1978 | Miller et al. | 375/11 |
| 4,285,045 | 8/1981 | Tamori et al. | 333/18 |
| 4,374,426 | 2/1983 | Burlage et al. | 364/724 |
| 4,388,693 | 6/1983 | Nakayama | 364/724 |

Primary Examiner—Benedict V. Safourek
Attorney, Agent, or Firm—Edward W. Goodman; William J. Streeter; Anne E. Barschall

[57] ABSTRACT

A data transmission system comprising a transversal smearing filter at the transmitting end and a transversal desmearing filter at the receiving end. To simplify the filters, at least the sequence of coefficients of the desmearing filter is formed by elements of the set $\{-1, 0, +1\}$, which results in an optimum smearing of noise pulses in the system compared with a system without such a filter.

6 Claims, 33 Drawing Figures

DATA TRANSMISSION SYSTEM

BACKGROUND OF THE INVENTION

The invention relates to a data transmission system comprising a transmitter and a receiver coupled thereto via a transmission path, the transmitter comprising a transversal smearing filter and the receiver comprising a transversal desmearing filter, the transversal filters each comprising a plurality of series-arranged delay elements, the time delay $\tau$ of each element being of the same duration as the sampling period of an input signal, and a signal processing arrangement coupled to taps arranged between every two consecutive elements, for, during at least each symbol interval T, multiplying the signals present on the taps by individual coefficients determined for each tap, and summing the product signals thus obtained, the signal processing arrangement also being coupled to an input of the first element and to an output of the last element.

Such a data transmission system is disclosed in inter alia U.S. Pat. No. 4,285,045, to Tamori et al.

For data transmission, use is often made of the public telephone network. Such a network introduces a number of imperfections such as: amplitude and phase distortions, frequency offset, phase jitter and both additive and impulsive noise. The effects of most of these imperfections are reduced or eliminated in modulation band systems with the aid of rather sophisticated digital modems. However, until now, little attention has been paid in the design of modems to reduce errors due to impulsive noise. The effects of impulsive noise on the transmission, affect predominantly switched connections and become the more noticeable as the transmission rates become higher.

A solution to combat the influence of impulsive noise is in the use of a smearing filter at the source side of the transmission system and a desmearing filter at the receiver side of the transmission system. In general, these filters have a flat amplitude response with a group delay time which linearly increases or decreases, respectively, as a function of the frequency, the sum of the group delay times of both filters being constant to the best possible extent. That is to say that the group delay time of one filter is complementary to the group delay time of the other filter. A data signal which passes through both filters is consequently only delayed in the case of ideal filters. However, a noise pulse passes only the desmearing filter so that the energy of such a noise pulse is smeared in time, so that its effect on the data signal is considerably reduced at any instant.

An analog implementation of such filters is described for modulation band systems in the article "On the potential advantage of a smearing-desmearing filter technique in overcoming impulse-noise problems in data systems", (by R. A. Wainright), published I.R.E. Transactions on Communication Systems, December 1961. In view of the stringent requirement that the group delays of both filters must be accurately matched, such an implementation is, in practice, rather complicated, more specifically because of the variation of the filter characteristics. To that end, it is known from U.S. Pat. No. 4,285,045 to use, for baseband signals, digital implementations of these filters, more specifically in the transversal form.

In order to obtain a proper smearing of the pulses, comparatively long filters are, however, required. The number of multiplications required per output signal for the weighting procedure is generally equal to the length of such filters. Moreover, if these filters are realized in the digital form, the coefficients for such filters have a word length of 8 bits. The associated large number of multiplications complicates the construction of such filters.

SUMMARY OF THE INVENTION

The invention has for its object to provide a data transmission system with a simpler and easier to realize smearing and desmearing filter than customary.

According to the invention, the data transmission system of type set forth in the opening paragraph, is characterized in that the sequence of coefficients $b_d(n) n=0,1,\ldots N-1$ of a transversal desmearing filter comprising $N-1$ delay elements is formed substantially wholly from elements of the set $\{-1, 0, +1\}$.

This has the advantage that for those coefficients which are $+1$, 0 or $-1$, by using or not using signal inversion of signals present at taps, no complicated multiplications need be performed, so that it is sufficient to sum those signals in at least each symbol interval. The computing time required in digital embodiments is thus considerably reduced, more specifically if all the coefficients have binary or ternary values.

A further embodiment is characterized in that for a given upper limit of the intersymbol interference caused by the cascade arrangement of the smearing filter and the desmearing filter, the sequence of coefficients $b_d(n)$ has been chosen such that for a given output power of the transmitter and a given overall gain of the transmission system, a substantially maximum value of a first merit factor $F_1$ is obtained, which is defined by $$F_1 = \frac{\max_n |(\tilde{p} * g)(n)|}{\max_n |(\tilde{p} * \tilde{b}_d * g)(n)|} \quad n = 0, 1, \ldots (N-1)$$

where $\tilde{p}(n) = p(n) e^{-jn\theta_c}$, $\tilde{b}(n) = b(n) e^{-jn\theta_c}$, where $\theta_c$ represents a given modulation angular frequency, $p(n)$ the sampling value of any given noise pulse introduced in the transmission path and $g(n)$ the impulse response of the filter action, reconverted to the zero frequency, of the receiver without desmearing filter.

This has the advantage that a substantially optimum smearing of the impulsive noise is realized by means of the desmearing filter having simple coefficients.

An embodiment of baseband signals is characterized in that the smearing filter comprises $M-1$ delay elements where $M \geq N$ and that the coefficients $b_s(m)$, where $m=0, 1, 2, \ldots M-1$ of this filter are given by $$b_s = (\phi_{bd}^{-1} b_d / b_d^T \phi_{bd}^{-1} b_d)$$

where $$\underline{b}_d = (0,0, \ldots 0, b_d(0), b_d(1), \ldots, b_d(N-1), 0,0,0)^T,$$

$$\overset{(M-N)/2}{\phantom{b_s}} \qquad\qquad \overset{(M-N)/2}{\phantom{b_s}}$$

$$\underline{b}_s = (b_s(0), b_s(1) \ldots, b_s(M-2), b_s(M-1))^T$$

$$\phi_{bd} = \begin{pmatrix} \phi_{bd}(0) & \phi_{bd}(1) \ldots \phi_{bd}(M-1) \\ \phi_{bd}(1) & \phi_{bd}(M-2) \\ \phi_{bd}(M-1) & \ldots \phi_{bd}(0) \end{pmatrix}$$

and $$\phi_{b_d}(m) = \sum_n b_d(n) \, b_d(n + m).$$

This has the advantage that both the desmearing filter and the smearing filter can be realized in a simple way, as the input signals are $+1$ or $-1$, and, in addition, a maximum smearing efficiency of the impulse noise has been realized. This implies that for the same degree of smearing as with the complicated filters of the prior art, the additional advantage of shorter filters is obtained.

An embodiment of the modulation band is characterized in that for the sequence of coefficient $b_s(n)$, where $n = 0, 1, \ldots (N-1)$, of the smearing filter having $(N-1)$ delay elements it holds that $$b_s(n) = b_d(N_o - n)$$

for any value of $N_o$ and all values of $n$.

This has the advantage that the smearing filter can be realized by applying time inversion (interchanging the coefficients) to the desmearing filter.

DESCRIPTION OF THE DRAWINGS

The invention and its advantages will now be described in greater detail, by way of example, with reference to the signals illustrated in the accompanying figures. Therein:

FIG. 19b shows the overall impulse response of the system of FIG. 12, comprising smearing and desmearing filters shown in FIG. 19a;

FIG. 19c shows the impulse response of a noise pulse occurring on the transmission path of FIG. 12, which impulse response is smeared by the receiver shown in FIG. 12 which comprises a desmearing filter having an impulse response as shown in fIG. 19a;

FIG. 20c shows the impulse response of a noise pulse occurring on the transmission path of FIG. 12, which is smeared by the receiver of FIG. 12b which comprises a desmearing filter having an impulse response as shown in FIG. 20a.

DESCRIPTION OF THE PREFERRED EMBODIMENT

Figure 1:
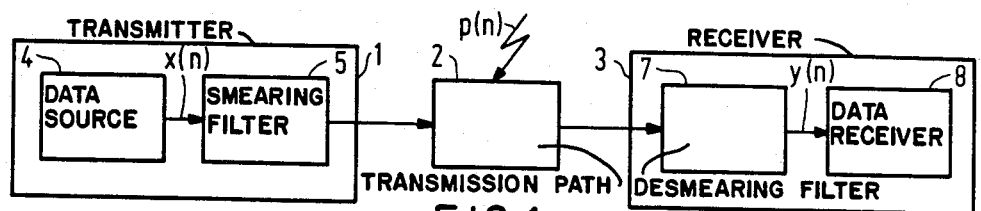
FIG. 1 shows a data baseband transmission system.

The baseband data transmission system shown in FIG. 1, comprises a transmitter 1 having a data source 4, and a receiver 3, which comprises a data receiver 8, and is coupled to the transmitter via a transmission path 2, The transmission path 2 includes, for example, entirely, or partly, the public telephone network. Such a network comprises switched connections which introduce inter alia impulse noise $p(n)$, where $n = 1, 2, 3, \ldots$ in the transmission path 2. So as to reduce the influence of the impulse noise $p(n)$ on the signal transmission, the transmitter 1 comprises a transversal smearing filter 5 connected to the data source and the receiver 3 comprises a transversal desmearing filter 7 which, in this embodiment, precedes the actual data receiver 8.

Figure 2:
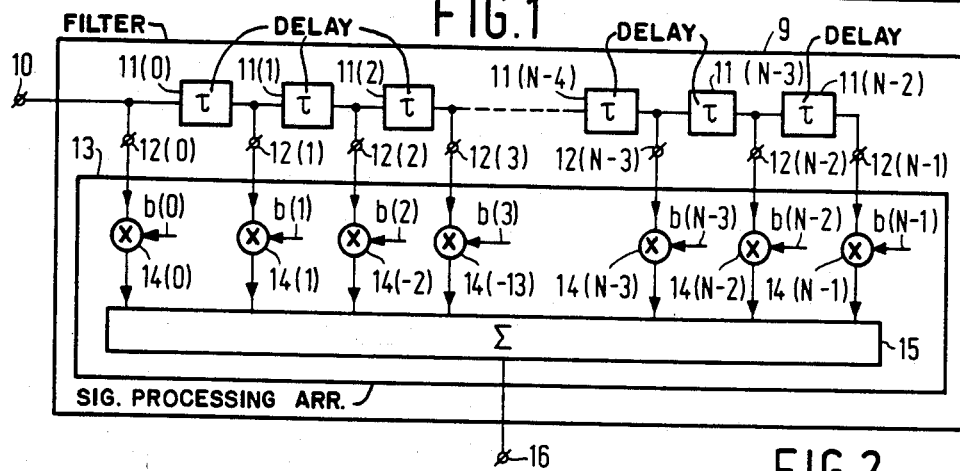
FIG. 2 shows a transversal filter.

FIG. 2 shows an embodiment of a transversal filter 9. Such a filter comprises a cascade arrangement of N−1 delay elements 11(0) to 11(N−2), each producing a time delay τ equal to the sampling frequency of the signals x(nτ) applied to input terminal 10. For a data signal applied in the baseband to an input 10, the time delay τ is equal to the symbol period T of a data signal applied thereto. For modulation band signals, that is to say signals modulated on a carrier signal such as a data signal located in the speech band, the sampling period τ is less than the symbol period T as will be described in greater detail in an embodiment for a speech-band signal. The cascade arrangement 11(0) to 11(N−2) can be realized in a simple way with the aid of a shift register in digital implementation, or with the aid of what is commonly denoted as a bucket memory in analog implementation. A tap 12(0) is connected to the input to the first delay element 11(0), while the respective taps 12(1); 12(2) . . . ; 12(N−2); 12(N−2) are connected to the junction between every two consecutive elements 11(0)-11(1); 11(1)-11(2); . . . 11(N−3)-(N−2) and the tap 12(N−1) is connected to the output of the last element 11(N−2). The taps are connected to a signal processing arrangement 13 for multiplying by means of multiplier arrangements 14(0) to 14(N−1) the signals x(nτ) present at the taps 12(0) to 12(N−1) by coefficients b(0) to b(N−1) applied individually thereto. In the analog form, these multipliers are potentiometers, whose taps represent the value of the coefficients b(n). In the digital structure, the values b(n), n=0, 1, . . . N−1 are stored in a store, not shown. The product signals thus obtained are summed during at least each symbol interval in a summing device 15 and applied as an output signal Σb(n) x(n τ) to output 16. If the coefficients b(n)$^n$, where n=0, 1, 2, . . . N−1 are chosen such that they constitute elements of the set {1, 0−1}, the multipliers are assembled from direct connections, open connections and/or inverters, so that then a considerable simplification of the filter can be realized.

The smearing filter 5 shown in FIG. 1 can be characterized by its impulse response $b_s(n)$, where n=0, 1, . . . (N−1), and the desmearing filter 7 can be characterized correspondingly by its impulse response $b_d(n)$. The data signal produced by the data source 4 can be denoted x(n) and, in this embodiment, has only the binary values ±1. For the sake of simplicity, the impulse noise p(n) is modelled by a single impulse of amplitude K, relative to the data, and occurs at an arbitrary time $n_o$. This model of the impulse noise p(n) is useful as long as the noise pulses have a duration shorter than τ and the interval between consecutive noise pulses exceeds the duration of the impulse responses of the filters 5 and 7. Then the data system shown in FIG. 1 can be replaced by the circuit diagram shown in FIG. 3.

The output signal y(n) can be written as:

$$y(n) = (x*b_s*b_d)(n) + (p*b_d)(n) \\ = (x*r)(n) + Kb_d(n-n_o) \quad (1)$$

where $$r(n) = (b_s * b_d)(n) = \sum_k b_s(k) b_d(n-k) \quad (2)$$

and represents the overall impulse response.

Ideally, the cascade arrangement must produce a pure delay over, for example, $N_o$ sampling values. For example $$r(n) = \delta(n-N_o) \quad (3)$$

In that case, error-free detection is possible as long as the amplitude K of the impulses is such that for each n it holds that $$|Kb_d(n)| < 1 \quad (4)$$

as then, irrespective of the time of occurrence $n_o$ of the impulse, it holds that $$\text{sign}(y(n)) = \text{sgn}(x(n-N_o) + Kb_d(n-n_o)) = \text{sign}(x(n-N_o)) \quad (5)$$

So the smearing effect becomes better, accordingly, as the maximum value of $|b_d(n)|$ is less, as then, according to (4), larger pulses do not result in erroneous detection.

From this a first merit factor can be defined, namely the quantity $$F_1' = \frac{1}{\max_n |b_d(n)|} \quad (6a)$$

This merit factor indicates the degree of smearing of one noise pulse when a desmearing filter is used, compared with a system without such a filter. For any impulse noise p(n), a general first merit factor $F_1$ can be defined in a corresponding way, namely $$F_1 = \frac{\max_n |p(n)|}{\max_n |(p*b_d)(n)|} \quad (6b)$$

The optimization of the first merit factor $F_1$ or $F_1'$ can easily be realized by choosing the values of $b_d(n)$ to be arbitrarily low and to increase, simultaneously, the values $b_s(n)$. This, however, corresponds to the trivial case of increasing the transmission power. Consequently, the constraint of a normalized transmission power is introduced, which, for independent data, results in the requirement that $$\sum_n |b_s(n)|^2 = 1 \quad (7)$$

So far it has been assumed that an overall impulse response equal to a δ-function can be realized with the two filters 5 and 7. This implies that the filters 5, 7 are inverse to each other but for a fixed delay, that is to say, they are complementary to each other. The only causal filters that have a strictly causal inverse are minimum phase filters. The smearing efficiency expressed in $F_1$ or $F_1'$ of such filters is however low. Moreover, it is desirable that the smearing filter 5 does not have a large attenuation for certain frequencies as then the demanding filter must have a large gain at those frequencies, thereby enhancing other types of interferences such as the Gaussian noise.

Generally, filters are therefore required with a highest possible all-pass characteristic and the phase of the smearing and desmearing filters must then add-up as nearly as possible to a linear phase, corresponding with a delay over $N_o$ sampling periods.

Since the filters 5 and 7 are not really complementary, the deviation from the ideal situation, shown in (3), can be written as $$r(n) = \delta(n - N_o) + \beta(n) \qquad (8)$$

Where $\beta(n)$ represents the deviation from the ideal situation. Assuming the gain of the filters to be chosen such that $$r(N_o) = 1 \qquad (9)$$

then it holds that $$\beta(n_o) = 0 \qquad (10)$$

Assuming the transmission to be free from pulse noise, an output signal will be obtained equal to $$y(n) = (x * r)(n) \qquad (11)$$
$$= x(n - N_o) + \sum_{k \neq N_o} \beta(k) x(n - k)$$

The additional term $$s(n) = \sum_{k \neq N_o} (k) x(n - k) \qquad (12)$$

is the intersymbol interference caused by the non-perfect matching of the filters 5 and 7.

This term decreases the detection margin for the received data. Therefore, this term must be adequately low so as to prevent too high a bit error rate from occurring.

Assuming the data $x(n)$ is independent, the variation of $s(n)$ is given by $$\sigma_s^2 = \sum_k \beta^2(k) \qquad (13)$$

So in the baseband, a second merit factor $F_2^b$ can be defined as $$F_2^b = \frac{1}{\sigma_s} = \frac{1}{\sqrt{\sum_k \beta^2(k)}} \qquad (14)$$

which represents the ratio of the amplitude of the received data and $\sqrt{N}$ times the rms value of the self-generated intersymbol interference.

Figure 4:
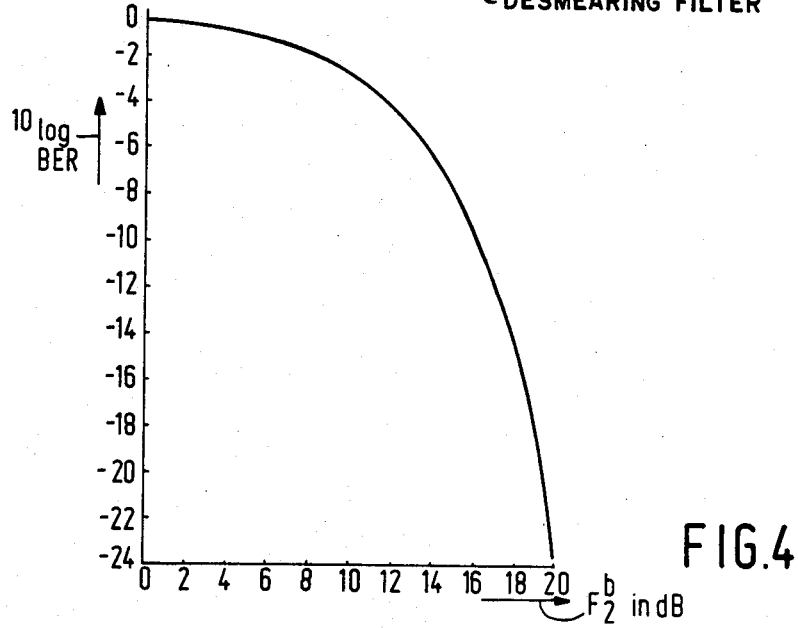
FIG. 4 is a graph in which BER is plotted versus a second merit factor $F_2{}^b$, both expressed in dB's, for binary signal.

The relation between the bit error rate (BER) and the variance of the interference for binary signalling is shown in FIG. 4. To obtain an adequately low bit error rate, it is a condition that $$20 \log F_2^b > 16 \text{ to } 18 \text{ dB}$$

The coefficients of the desmearing filter 7 can be written as $$b_d(n) = B_d b(n) \qquad (15)$$

where $$B_d = \max_n |b_d(n)|,$$

so that, consequently, $|b(n)| \leq 1$ for all n. Likewise, the coefficients of the smearing filter 5 can be written as $$b_s(n) = B_s c(N_o - n) \qquad (16)$$

where $N_o = N - 1$, $0 \leq n \leq N - 1$ and $$B_s = \max_n |b_s(n)|.$$

These impulse responses must satisfy the power constraints given in (7), and (8, 10). From these conditions, it follows that $$\sum_n b_s^2(n) = B_s^2 \sum_n (c(N_o - n))^2 = 1$$

and that $$\sum_n b_s(n) b_d(N_o - m) = \sum_n B_s c(N_o - n) B_d b(N_o - n) = 1$$

So the smearing factor $F_1'$ is given by $$F_1' = \frac{1}{B_d \max_n |b(n)|} \qquad (17)$$

From the above derivation and the inequality of Cauchy-Schwarz, it follows that $$F_1' = B_s \sum_n c(N_o - n) b(N_o - n) \qquad (18)$$

$$\leq B_s \left( \sum_n (c(N_o - n))^2 \right)^{\frac{1}{2}} \left( \sum_n b(N_o - n)^2 \right)^{\frac{1}{2}}$$

$$= \left( \sum_n b(N_o - n)^2 \right)^{\frac{1}{2}} \leq \sqrt{N}$$

there being equality then and only then when it holds for all n, $0 \leq n \leq N - 1$ that $$c(n) = b(n) \qquad (i)$$

$$b(n) \epsilon \{-1, 1\} \qquad (ii)$$

So from this it follows that the absolute maximum of $F_1'$ is only obtained when the coefficients of the desmearing filter all have equal absolute values, and when the coefficients of the desmearing filter are given by the sequence obtained by time-inversion of the sequence of cofficients of the desmearing filter.

This proves that of all sequences, binary sequences have the best smearing factor for single pulses in a baseband transmission system.

Of course all the binary sequences having a length N produce the same value $F_1' = \sqrt{N}$. However, these sequences are not all equally suitable as an impulse response for a smearing filter, since they must also produce a high value for the merit factors $F_2^b$.

This causes the problem of finding binary sequences for which expression (14) is at its maximum. The convolution operation, as shown in the expression (2), which expresses the overall impulse response $r(n)$ in $b_s(n)$ and $b_d(n)$, is equivalent to a correlation for the case in which the two sequences are inverse to each other in the time.

The expression (14) can be written as follows for binary sequences $$F_2^b = \frac{1}{\sqrt{\sum_k \beta^2(k)}} = \frac{N}{\sqrt{\sum_{k \neq 0} R^2(k)}} \qquad (19)$$

$$= \frac{N}{\sqrt{2 \sum_{k=1}^{N-1} R^2(k)}}$$

where $R(k) = \Sigma b_d(1) b_d(1+k)$, which is the $k^{th}$ autocorrelation coefficient of the sequence $b_d^1(n)$.

So, finding filters having an optimum merit factor $F_2'$ corresponds to finding binary sequences having an optimum correlation property. The sequences which are suitable for use must have a correlation function with a large main lobe and small side lobes, so they must preferably satisfy the requirement that $$|R(k)| = \left| \sum_1 b(1) b(1+k) \right| \le 1, k \ne 0 \quad (20)$$

Examples of binary sequences which satisfy these requirements are described in inter alia the article "Sieves for low autocorrelation binary sequences" by M. J. E. Golay, published in IEEE Transactions on Information Theory IT-23, January 77, pages 43-51 and the article "The merit factor of long low autocorrelation binary sequences" by M. J. E. Golay, published in IEE Transactions Vol. IT-28, No. 3, May 1982, pages 543-549. The sequences mentioned in these articles will be referred to as Golay sequences hereinafter.

From these articles, it is known that the ratio $$N^2 / \sum_{k \ne 0}^{N} R^2(k)$$

is asymptotically less than 12.32. This implies that if the length N of the desmearing filter is taken to be very large, that $$F_1' = \sqrt{N}$$

and $$F_2^b = \sqrt{12.32} = 3.51 \text{ or } 10.91 \text{ dB}.$$

As can be seen from FIG. 4, this results in a bit error rate (BER) of $\approx 10^{-5}$.

Figure 5:
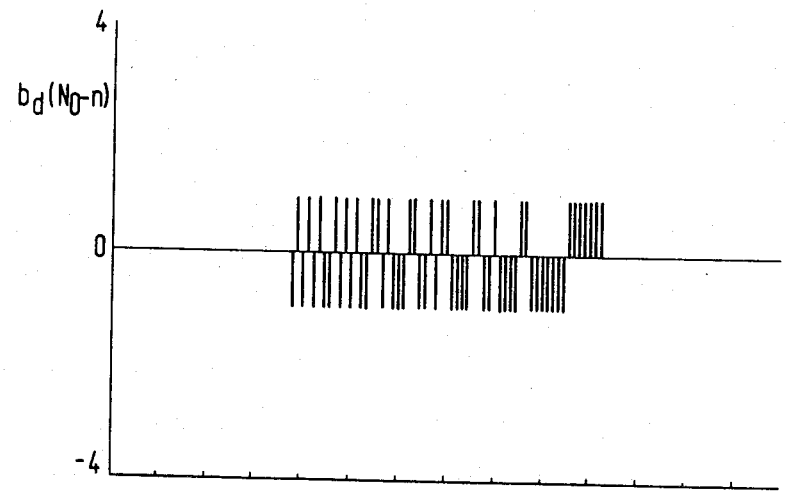
FIG. 5 shows an example with $N = 59$ binary coefficients $b_d(n)$ of a desmearing filter for a baseband transmission system according to the invention.
Figure 6:
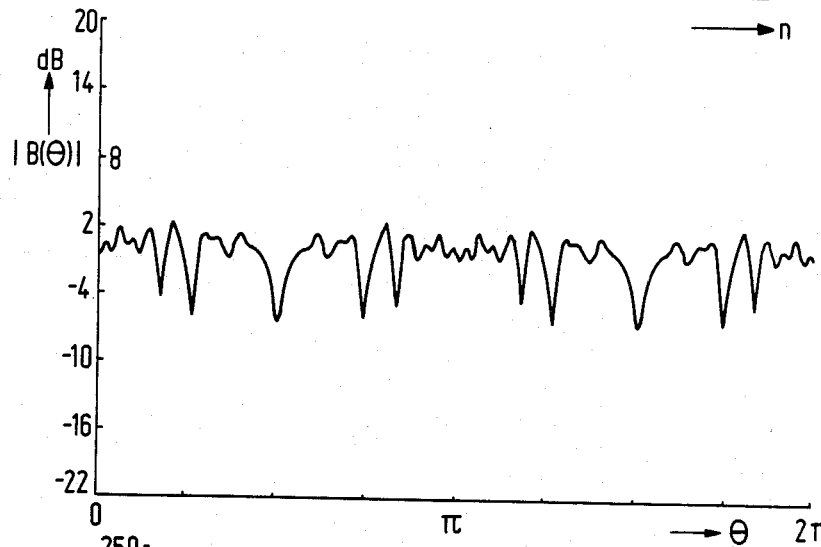
FIG. 6 shows the absolute value of the transmission function $B(\theta)$ of the desmearing filter, where $\theta$ is the signal frequency normalized to the sampling frequency for the impulse response shown in FIG. 5.

For the longest known Golay sequence, for which the coefficients $b_d(N_o - n)$ of the desmearing filter in FIG. 5 are shown and whose absolute value of the associated transmission function $B_d(\theta)$ for the frequence $\theta$ normalized to the sampling frequency is shown in FIG. 6, is $$F_1' = 7.68$$

and $$F_2^b = 2.91 = 9.29 \text{ dB}$$

Figure 3:
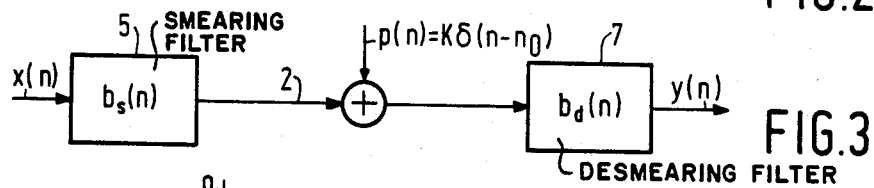
FIG. 3 is an equivalent circuit diagram of the transmission system shown in FIG. 1.

In the baseband signal shown in FIGS. 1 and 3, the symbol period T is equal to the sampling period $\tau$ so that the signal frequency $\theta$, normalized to the sampling frequency, extends from 0 to $2\pi$. So far it has been assumed that the coefficients of the smearing filter were also binary coefficients, but as the data signal in the baseband is also assumed to be binary or ternary, a simple smearing filter can alternatively be realized without binary coefficients. This renders it possible to realize a higher value of the merit factor $F_2^b$ for the same binary sequence for the coefficients of the desmearing filter.

Starting from a Golay sequence b(n) of the required length N for the merit factor $F_1'$, a sequence of numbers q(n) for the non-binary coefficients of the smearing filter is determined by minimizing the quantity $$\sum_{m \ne 0} R^2(m) = \sum_{m \ne 0} \left( \sum_n q(n) b(m+n) \right)^2 \quad (21)$$

to realize a maximum value of $F_2^b$, it being necessary to satisfy the power constraint $$\sum_n q(n) b(n) = 1 \quad (22)$$

From 21 and 22, it can be derived that the optimum value of $b_s(n)$ can be determined using the following procedure. Let:

$$q = (\phi_b^{-1} b) / (b^+ \phi_b^{-1} b) \quad (23)$$

where $$b = (b(0), b(1), \ldots b(N-1))^T \quad (24)$$

$$q = (q(0), q(1), \ldots q(N-1))^T \quad (25)$$

and $$\phi_b = \begin{pmatrix} \phi_b(0) & \phi_b(1) & \ldots \phi_b(N-1) \\ \phi_b(1) & \phi_b(0) & \ldots \phi_b(N-2) \\ \phi_b(N-1) & \phi_b(N-2) & \ldots \phi_b(0) \end{pmatrix} \quad (26)$$

with $$\phi_b(m) = \sum_n b(n) b(m+n) \quad (27)$$

Thereafter $B_s$ is determined from $$B_s = \frac{1}{\sqrt{\sum_n (q(n))^2}} \quad (28)$$

and $B_d$ from $$B_d = 1/B_s \quad (29)$$

The coefficients $b_s(n)$ are then equal to $$b_s(n) = B_s q(N-1-n) \quad (30)$$

and $$b_d(n) = B_d b(n) \quad (31)$$

If the Golay sequence with N=59 is chosen again for the coefficients b(n), then the use of the expressions (21) to (27) result in that $$F_1 = 7.23$$

and $F_2 = 4.62 = 12.39 dB$

The optimization of the smearing filter 5 consequently results, compared with the case of binary coefficients, in a considerable improvement of the second merit factor $F_2^b$ for a slight loss in quality of the first merit factor $F_1'$.

The factor $F_2^b$ can even be further increased by using a smearing filter 5 of a greater length than the desmearing filter 7. This implies that the sequence $q_s(n)$, which, in accordance with expression (23), is determined in the optimization procedure, may have a length $M > N$. In that case the vector b must consist of the binary sequence b(n) appended with $M-N$ zeroes to enable continued use of (23). The zeroes may be randomly added to the sequence b(n) but for the sake of symmetry, the number of zeroes is chosen to be even and half of the number of zeroes is placed at the head and the other half at the tail of the sequence b(n). For example, when the difference between M and N is chosen to be equal to 2L, b is defined, instead of by the expression (24), by the expression $$\underline{b} = (\underset{L}{\underbrace{0,0 \ldots 0}}, b(0), b(1) \ldots b(N-1), \underset{L}{\underbrace{0,0 \ldots ,0}}) \quad (32)$$

And the vector, $q_s$ is not defined by (25) but rather by $$q_s = (q_s(0), q_s(1), \ldots , q_s(M-1))^T \quad (33)$$

The sequence of coefficients $b_s(n)$ is then given by $b_s(n) = B_s q(M-1-n)$ instead of by (30). The other expressions are not changed.

Solving (23) requires the inversion of an (M*M) matrix, but this matrix is of the Toeplitz type. For its inversion, efficient algorithms are known, inter alia from the publication "Linear Prediction: A Tutorial Review", by J. Makhoul, published in the Proceedings of the IEEE, Vol. 63, No. 4, April 1975, pages 561–580.

Figure 7:
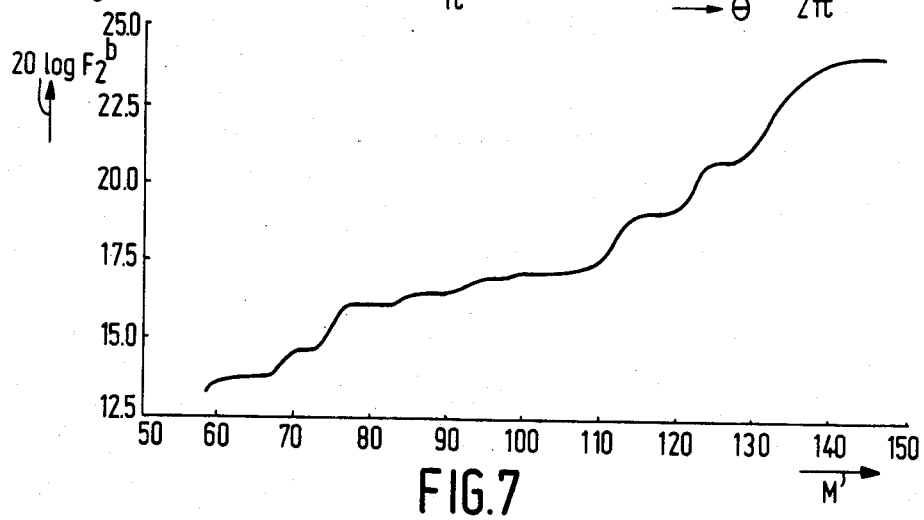
FIG. 7 is a graph in which the second merit factor $F_2{}^b$ is shown as a function of the number of coefficients M of the smear filter at a number of coefficients equal to 59 for the desmearing filter whose impulse response is shown in FIG. 5.

In FIG. 7 the 20 log of the second merit factor $F_2^b$ is plotted versus the quantity M, the coefficients of the desmearing filter 7 corresponding to the Golay sequence shown in FIG. 5, where $N=59$.

Figure 8:
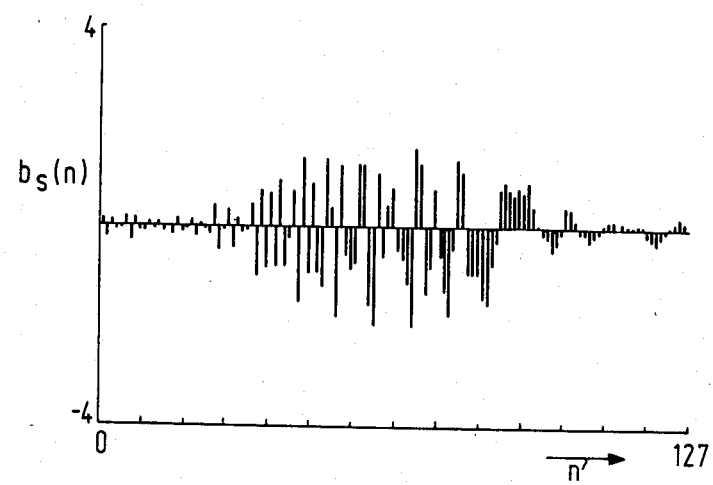
FIG. 8 shows an example of the coefficients $b_s(n)$ for a smearing filter having a number of coefficients $M = 127$ according to the invention.
Figure 9:
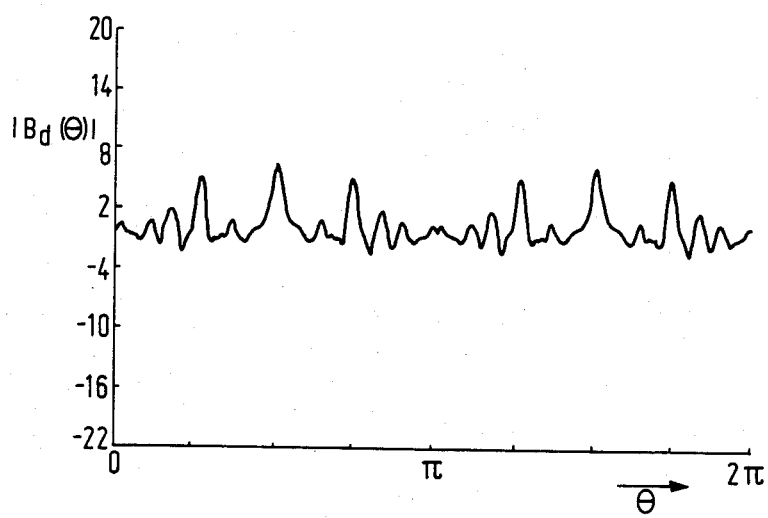
FIG. 9 shows the absolute value of the transmission function $B_s(\theta)$ as a function of the signal frequency normalized to the sampling frequency for the impulse response shown in FIG. 8.
Figure 10:
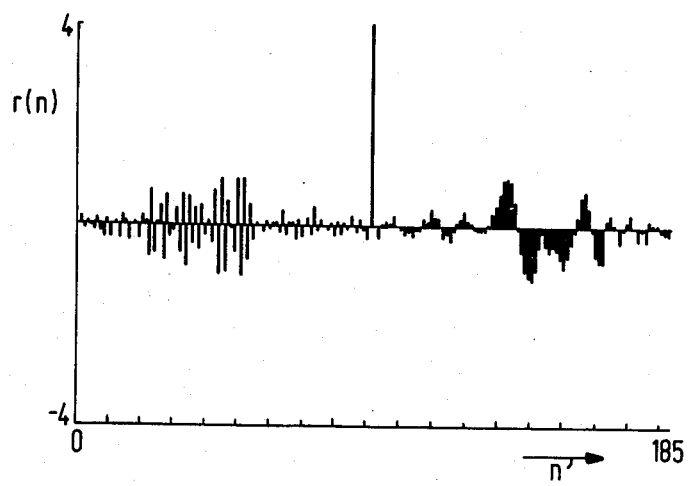
FIG. 10 shows the overall impulse response of the transmission system shown in FIG. 3 with the impulse responses shown in FIGS. 5 and 8 of the desmearing and the smearing filters, respectively.
Figure 11:
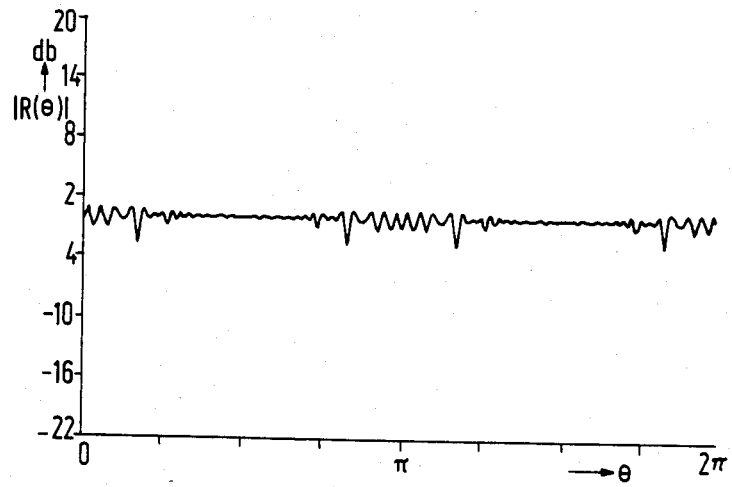
FIG. 11 shows the absolute value of the transmission function $R(\theta)$, versus the signal frequency normalized to the sampling frequency for the impulse response shown in FIG. 10.

To obtain a value of the factor $F_2^b$ larger than 20 dB, which, as shown in FIG. 4, corresponds to a bit error rate of $10^{-24}$, we have selected $M=127$. The impulse response of such a smearing filter is shown in FIG. 8 and the absolute value of the corresponding transmission function is shown in FIG. 9. The overall impulse response $$r(n) = (b_s * b_d)(n)$$

is shown in FIG. 10, the peak value $r(N_o)$ being greatly reduced. The absolute value of the associated transmission function $R(\theta)$ is shown in FIG. 11. For this case, the values of the merit factors are equal to $F_1' = 6.96$ and $F_2^b = 11.055$ or $20.87$ dB Compared with the case where $M=N=59$, a very large improvement of the value of the second merit factor $F_2^b$ is obtained for an only slightly poor value of the first merit factor $F_1'$.

Further procedures for generating binary sequences b(n) having desired properties, which, as also holds for any arbitrary binary sequence with adequate aperiodical correlation properties, can be used in the baseband transmission system will now be described with reference to the transmission system for a modulation band shown in FIG. 12.

Figure 12:
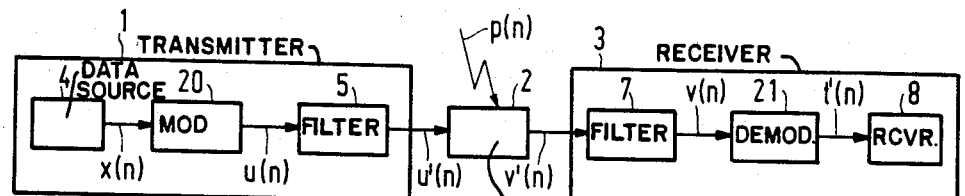
FIG. 12 shows a modulation band transmission system.

The transmission system shown in FIG. 12 is, unlike the base-band system shown in FIG. 1, what is commonly denoted as a modulation band system. This means that the data transmitter 1 comprises a modulator 20 arranged between the data source 4 and the smearing filter 5 for modulating the baseband signal on a carrier, and the receiver 3 comprises a demodulator 21 arranged between the desmearing filter 7 and the data receiver 8 for demodulating a received modulated carrier signal. The design of a smearing filter 5 and a desmearing filter 7, which can be easily realized for such a transmission system will be described in greater detail with reference to a modulation band system operating in the 600 to 3000 Hz speech band, it being assumed that the data source 4 produces a 4800 bits/sec. data signal and that the modulator 20 modulates a 1800 Hz carrier signal $f_o$ in 8-phases.

Figure 13A:
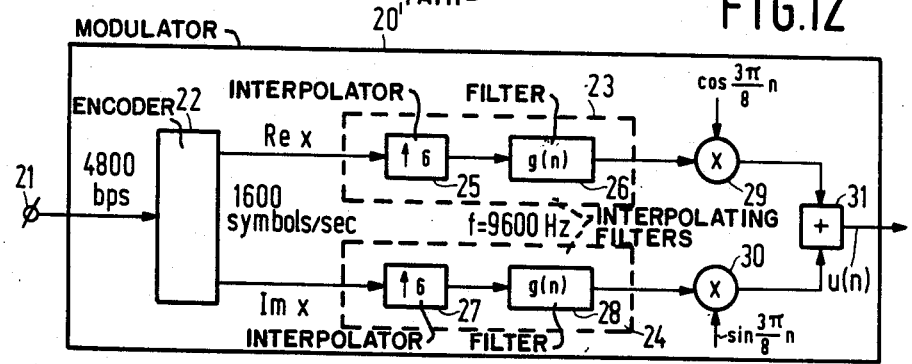
FIG. 13a shows a block circuit diagram of a modulator having real signal values for use in the system shown in FIG. 12.
Figure 13B:
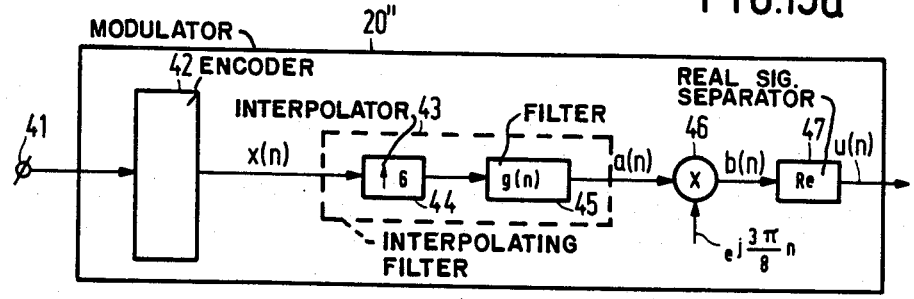
FIG. 13b is a block circuit diagram of a modulator having complex signal values for use in the system shown in FIG. 12.

FIG. 13a shows a block circuit diagram of an embodiment 20' of the modulator 20, based on real value signals and FIG. 13b shows a block circuit diagram of an equivalent representation of this embodiment 20'' for signals having complex values.

A data signal applied to the modulator 20' of FIG. 13a and 20'' of FIG. 13b, respectively, with a bit frequency of 4800 bit/sec is converted in an encoding device 22 or an identical encoding device 42, respectively, known manner in blocks of three consecutive bits, into a complex number x(n), which repeatedly assumes one out of eight possible values from the below-defined set.

$$x(n) \in \left\{ e^{j\frac{\pi}{4}K} \mid K = 0, 1, \ldots 7 \right\} \quad (34)$$

where $n = 0, \pm 1, \ldots$.

The symbol rate for x(n) has then become equal to $4800/3 = 1600$ symbols/sec.

Figure 14:
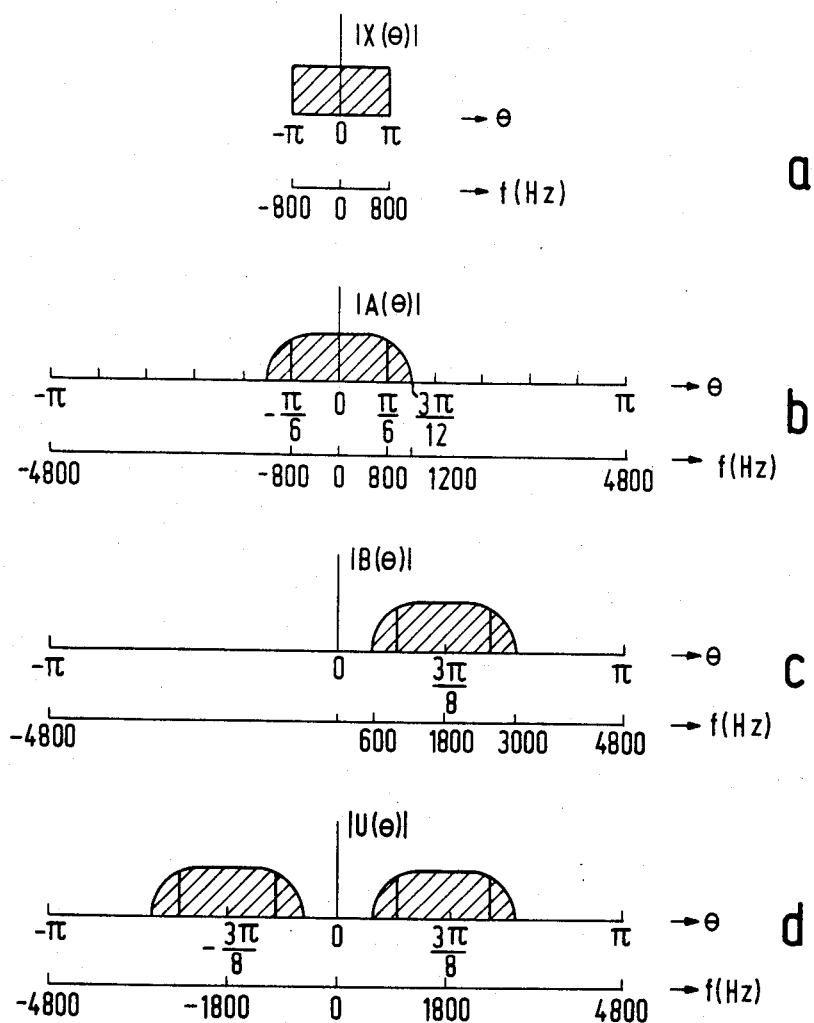
FIGS. 14a to 14d show amplitude spectra of the signals occurring in the modulator of FIG. 13b.

The frequency spectrum $|X(\theta)|$ of the sequence x(n) produced by the encoding device 42 is shown in FIG. 14a as a function of the frequency $\theta$, $\theta$ representing the angular frequency $\omega$ normalized to the symbol frequency $f_b$; $\theta = \omega/f_b$.

The coding device 22 shown in FIG. 13a applies the real portion Re(x) of the complex numbers x(n) to a first interpolating filter 23 and the imaginary portion Im(x) of x(n) to a second interpolating filter 24, which filter 24 is identical to the first filter 23. Each of these interpolating filters comprises an interpolator 25, 27 and connected thereto transmit filters 26 and 28, both having an impulse response g(n). In the interpolators 25 and 27, five samples having zero values are added in known manner, each time, between two consecutive signal samples applied to it, the scanning rate being thereby increased by a factor equal to 6 to 9600 Hz. The baseband signal is filtered from the sequences produced by the interpolators 25 and 27 by means of the transmit filters 26 and 28.

In an equivalent manner of describing complex signals, the sequence x(n) produced by the coding device 42 is applied to a complex interpolating filter 43 in which the sampling frequency is similar increased, in an interpolator 44, by a factor of 6 to 9600 Hz and is thereafter filtered in the transmit filter 45 having an impulse response g(n). The values of the impulse response g(n) are obtained by turning the sequences obtained by an inverse Fourier transform of an ideal transmission function $G(\theta)$ given by $$G(\theta) = \begin{cases} 1 & \text{for } |\theta| < \frac{\pi}{12} \\ \cos\left(\theta - \frac{\pi}{12}\right) & \text{for } \frac{\pi}{12} < \theta \leq \frac{\pi}{4} \\ 0 & \text{for } \theta | > \frac{\pi}{4} \end{cases} \quad (35)$$

This transmission function is also used in an identical filter in the receiver, but then acting as a band-pass filter, centered around the 1800 Hz carrier frequency. The transmission function is such that the cascade arrangement of the transmit filter and the receive filter is defined by the first Nyquist criterion, which requires that $$\sum_{K=0}^{5} G^2\left(\frac{\theta - 2K - \pi}{6}\right) = 1 \quad 0 = \theta = 2\pi \quad (36)$$

Figure 15:
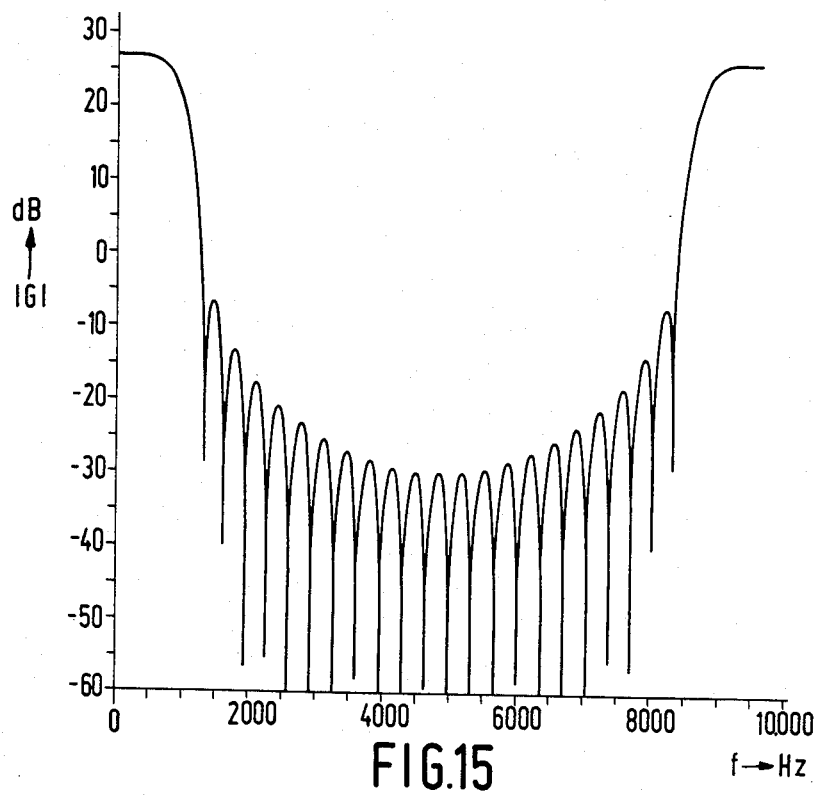
FIG. 15 shows the absolute value of the transmission function of the transmit filter used in the modulator of FIG. 13b.

The amplitude of the transmission function G in accordance with an embodiment of a 29-tap FIR filter is shown in FIG. 15. Hereinafter, let it be assumed that these filters are zero-phase filters, the linear phase component necessary to make these filters into causal filters being disregarded.

This implies that g(n) has a maximum at n=0 and is symmetrical to both sides, so that $$g(n) = g(-n) \quad (37)$$

The amplitude spectrum $|A(\theta)|$ of the signal a(n) supplied by the third interpolating filter 43 is shown in FIG. 14b.

The signals produced by the first and second interpolation filters 23 and 24 are thereafter modulated in a manner known per se onto a carrier having a frequency $f_c$ with the aid of first and second multiplier means 29 amd 30, to which also signals $$\cos\left(\frac{3\pi}{8} n\right)$$

and $$\sin\left(\frac{3\pi}{8} n\right)$$

are applied, where $$2\pi f_c/f_s = 2\pi \, 1800/9600 = \frac{3\pi}{8}.$$

The signals thus obtained are added together in an adder arrangement 31 and applied to the smearing filter 5 shown in FIG. 12.

In an equivalent description of complex signals, the signal a(n) shown in FIG. 13b is multiplied in a multiplier arrangement 46 by the standardized carrier signal $$e^j = \frac{3\pi}{8} n.$$

The amplitude spectrum $|B(\theta)|$ of the signal b(n) produced by the multiplier arrangement 46 is shown in FIG. 14c. Thereafter, by means of an arrangement 47, a real signal u(n) is derived from the complex signal b(n), the amplitude spectrum $|U(\theta)|$ of this real signal being shown in FIG. 14d.

From this Figure, it follows that the speech band signal thus obtained only has a contribution in the interval $$\frac{\pi}{8} \leq \theta \leq \frac{5}{8} \pi$$

corresponding to a 600 Hz to 3000 Hz frequency band which will be designated speech band in the sequel. Utilizing the fact that the spectrum $X(\theta)$ of the input signal is a periodic spectrum with a $2\pi$ period, the spectrum of the amplitude signal u(n) can be represented as follows:

$$U(\theta) = \tfrac{1}{2}G(\theta-\theta_c)X\{6(\theta 31 \\ \theta_c)\} + \tfrac{1}{2}G^*\{-(\theta+\theta_c)\}X^*\{-6(\theta+\theta_c)\} \quad (38)$$

where $\theta_c = 2\pi f_c/f_s$ and * is the complex conjugated value.

After having passed the smearing filter 5, the spectrum of the output signal u'(n) of the transmitter 1 can be written $$U'(\theta) = U(\theta)B_s(\theta) \quad (39)$$

where $B_s(\theta)$ represents the transmission function of the smearing filter. This output signal u'(n) is converted into an analog signal in a D/A converter, not shown, and a filter connected thereto for suppressing high-frequency contributions, and transmitted to the receiver 3 via the transmission channel 2.

In the receiver the received signal is applied to the desmearing filter 7 via an anti-aliasing filter and A/D converter, not shown. The influence of those elements which are not shown, may be left out of account because of the fact that they have a flat transmission function in said frequency range.

Figure 16A:
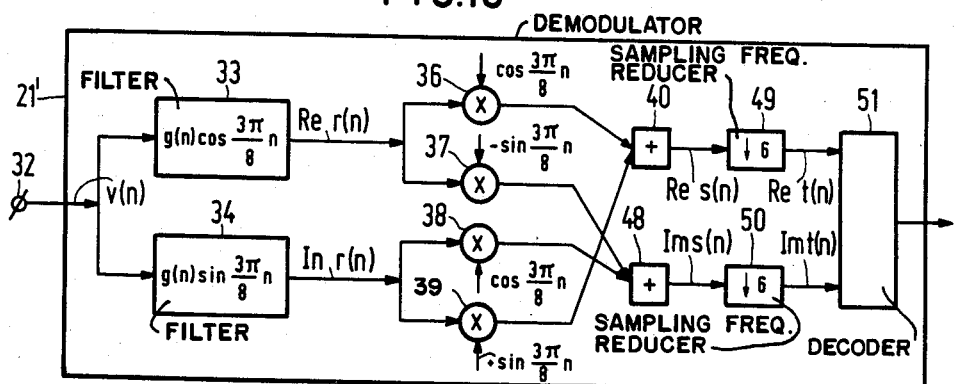
FIG. 16a shows a block circuit diagram of a demodulator having real signal values for use in the system shown in FIG. 12.
Figure 16B:
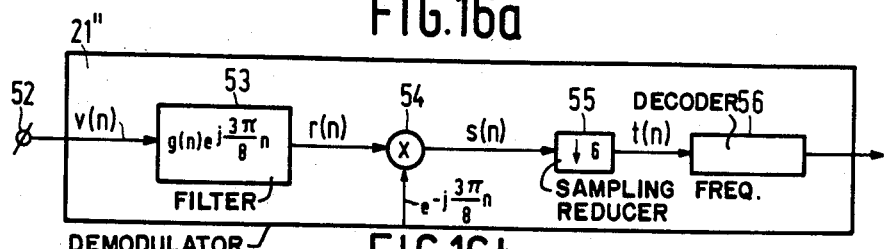
FIG. 16b shows a block circuit diagram of a demodulator having complex signal values for use in the system shown in FIG. 12.

FIG. 16a shows an embodiment 21' with digital real signal values for the demodulator 21 of FIG. 12 and FIG. 16b shows an equivalent representation of the embodiment 21'' with complex signal values. These demodulators operate with a 9600 Hz sampling frequency $f_s$.

The demodulator 21' comprises a quadrature receiver followed by a decoder arrangement 51.

Figure 17:
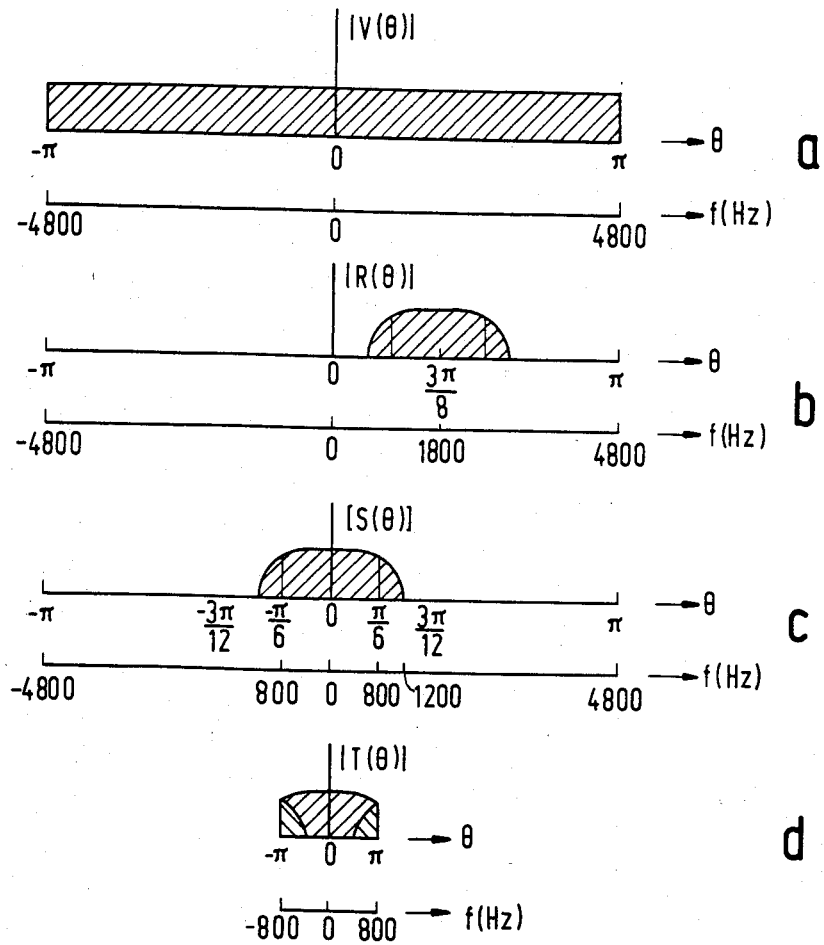
FIGS. 17a to 17d show amplitude spectra of the signals occurring in the demodulator of FIG. 16b.

Input terminal 32 receives a digital signal v(n), which is converted by the A/D converter, not shown, the amplitude spectrum $|V(\theta)|$ of which digital signal is shown in FIG. 17a as a function of $\theta$, where $\theta$ is equal to $\omega/f_s$. The input spectrum is assumed to be flat.

In FIG. 16a the digital signal v(n) is applied to a first receive filter 33, having an impulse response g(n) cos $\theta_c n$, and also to a second filter 34, having an impulse response g(n) sin $\theta_c n$, where $\theta_c = 2\pi f_c/f_s = 3\pi/8$, which filters 33, 34 suppy the band-limited mutually orthogonal signals Re r(n) and Im r(n).

In an equivalent description of complex signals, the signal v(n) applied to input terminal 52 is converted in, FIG. 16b, into the complex digital signal r(n), whose amplitude spectrum $|R(\theta)|$ is shown in FIG. 17b, in the digital filter 53 which has an impulse response g(n) $e^{j\theta_c n}$ and is used as the receive filter.

The impulse response of the receive filter 53 has been chosen such that the transmission function of this filter is a frequency-shifted version of the transmit filter chosen in FIG. 13b, so that constraint (36) is satisfied. The same holds for the receive filters 33 and 34 of FIG. 16a and the transmit filters 26 and 28 shown in FIG. 13a.

The digital signals Re r(n) and Im r(n) (FIG. 16a) are demodulated as follows. On the one hand, with the aid of the multipliers 36 and 39, the signals Re r(n) cos $\theta_c n$ and Im r(n) sin $\theta_c n$ are formed, which are added together in a summing arrangement 40 to form the digital Re $s(n)$=Re $r(n)$ cos $\theta_c n$+Im $r(n)$ sin $\theta_c n$ and, on the other hand, with the aid of the multipliers 37 and 38, the signals $-$Re r(n) sin $\theta_c n$ and Im r(n) cos $\theta_c n$ are formed, which are added together in a summing arrangement 48 to form the digital signal Im $s(n)$=Im $r(n)$ cos $\theta_c n$−Re $r(n)$ sin $\theta_c n$.

Similarly, the complex digital signal r(n) is demodulated in FIG. 16b with the aid of the multiplier 54 by multiplying it by the complex digital signal $e^{-j\theta_c n}$. FIG. 17c shows the amplitude spectrum of the complex digital signal s(n) thus obtained.

The sampling frequency $f_s$ of the digital signals Re s(n) and Im s(n) are decreased in a manner known per se by a factor of six to 1600 Hz with the aid of the arrangements 49 and 50 shown in FIG. 16a, whereby the digital signals Re t(n) and Im t(n) are obtained.

Similarly, the sampling frequency of the digital complex signal s(n) is decreased in FIG. 16b to 1600 Hz with the aid of the arrangement 55. The amplitude spectrum $|T(\theta)|$ of the signal t(n) thus obtained is shown in FIG. 17d. This Figure clearly shows folding of the amplitude spectrum $|T(\theta)|$ due to the fact that sampling was effected with two low of a frequency relative to the bandwidth of the signal.

As, however, the spectrum V(θ) of the signal applied to the demodulator 21 is identical to the spectrum U(θ) of the output signal of modulator 20 and as the product of the transmit filter (26, 28; 45) and the receive filter (33, 34; 53) satisfies the first Nyquist criterion the contribution to T(θ) of the folded portions adds coherently to those of the remaining portion and the spectrum X(θ) as shown in FIG. 14a is accurately obtained for T(θ). Because of clipping and rounding of the coefficients of the filters, some symbol interference is however produced, which, for the 29-tap FIR filters used, is so low as to be disregarded.

Finally, the signals Re t(n) and Im t(n) are converted in a manner known per se into 4800 bit/sec binary data signals with the aid of decoding arrangement 51 of FIG. 16a, and the signal t(n) is similarly converted into these binary data signals with the aid of the decoding arrangement 56 of FIG. 16b.

The spectrum of t(n) can be expressed as follows in the spectrum of g(n) of the receive filter and in the spectrum of the input signal v(n)

$$T(\theta) = \frac{1}{6} \sum_{k=0}^{5} G\left(\frac{\theta + 2k\pi}{6}\right) V\left(\frac{\theta + 2k\pi}{6} + \theta_c\right) \quad (40)$$

It being assumed, as above, that $V(\theta) = U(\theta)$ and when omitting the smearing filter 5 and the desmearing filter 7 from the link, (40) can be written with the aid of (38) as:

$$T(\theta) = \frac{1}{12} \sum_{k=0}^{5} G^2\left(\frac{\theta + 2k\pi}{6}\right) X(\theta) + \quad (41)$$

$$\frac{1}{12} \sum_{k=0}^{5} G\left(\frac{\theta + 2k\pi}{6}\right) G^*\left(-\frac{\theta + 2k\pi}{6} - 2\theta_c\right)$$

$$X(\theta + 12\theta_c)$$

As the attenuation of the stop band of the transmit and receiving filters have a sufficiently high value that the last term of (41) can be disregarded and it holds that $$T(\theta) = H(\theta)X(\theta) \quad (42)$$

where $$H(\theta) = \frac{1}{12} \sum_{k=0}^{5} G^2\left(\frac{\theta + 2k\pi}{6}\right) \quad (43)$$

If the smearing filter 5 and the desmearing filter 7 have the impulse responses $b_s(n)$ and $b_d(n)$ with the transmission functions $B_s(\theta)$ and $B_d(\theta)$, the frequency spectrum $T'(\theta)$ of the complex digital signal t'(n) can be written, when the transmit filter 45 and the receive filter 53 have a high attenuation in the stop band, as $$T'(\theta) = H'(\theta)X(\theta) \quad (44)$$

where $$H'(\theta) = \frac{1}{12} \sum_{k=0}^{5} G^2\left(\frac{\theta + 2k\pi}{6}\right) B_s\left(\frac{\theta + 2k\pi}{6} + \theta_c\right) \quad (45)$$

$$B_d\left(\frac{\theta + 2k\pi}{6} + \theta_c\right)$$

Figure 18A:
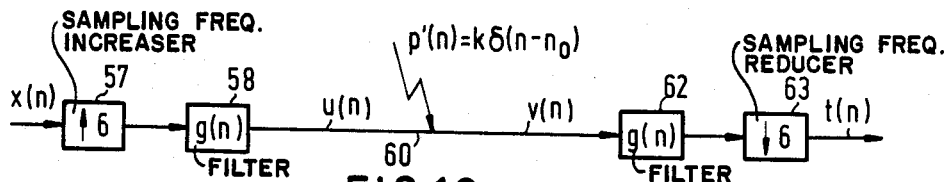
FIG. 18a shows an equivalent circuit diagram of a portion of the modulation band transmission system shown in FIG. 12 without smearing and desmearing filters.
Figure 18B:
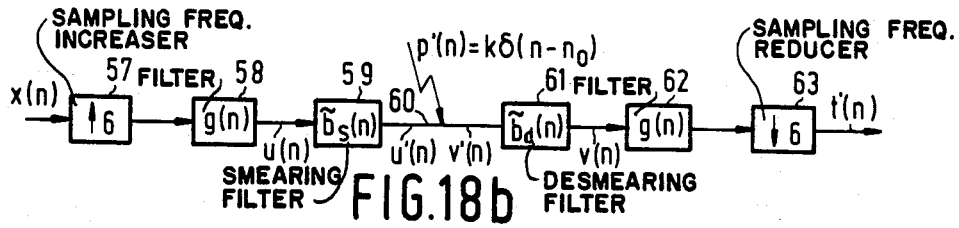
FIG. 18b shows an equivalent circuit diagram of a portion of the modulation band system shown in FIG. 12.

Equivalent circuit diagrams of the transmission systems represented by the expressions (42) and (44) without and with smearing and desmearing filters are shown in FIGS. 18a and 18b.

These systems both comprise, arranged one after the other, an arrangement 57 for increasing the sampling frequency by a factor of 6, a transmit filter 58 in the transmitter and a receive filter 62 and an arrangement 63 for decreasing the sampling frequency by a factor equal to 6, the system shown in FIG. 18b also comprising a smearing filter 59 and a desmearing filter 61.

The influence of the smearing filter 59 and of the desmearing filter 61 is represented in this situation by the complex impulse response $$\tilde{b}_s(n) = b_s(n)e^{-jn\theta_c} \quad (46)$$

or $$\bar{b}_d(n) = b_d(n)e^{-jn\theta_c} \quad (47)$$

respectively, the modulation being accounted for by the notation $\sim$.

As for the merit factors $F_1$ and $F_2$ which are derived for the baseband system shown in FIG. 1 and were a measure of the smearing efficiency of the impulsive noise of the frequency band or of the signal-to-noise ratio relative to the noise self-generated by the combination of the smearing and the desmearing filters, corresponding merit factors can be derived for the speech band system shown in FIG. 12.

In the derivation of these merit factors, the signal amplitudes must also be normalized so as to prevent the smearing filter from obtaining too high a gain factor, which would imply an increase of the power on the transmission path 2, for example, a telephone line.

Let it be assumed that:

(1) the power on the transmission path 60 with, as shown in FIG. 18b, and without, as shown in FIG. 18a, the smearing filter 59 and desmearing filter 61 is the same, so that it holds that:

$$E(u^2(n)) = E(u'^2(n)) \quad (48)$$

and that (2) the desired signal component in the output signals $t(n)$ and $t'(n)$ have the same amplitudes in both cases. By introducing adequate phase corrections in the transmission functions of the smearing filter 59 and the desmearing filter 61, the desired component can be defined as $h(O)$ and $h'(O)$, where $h(n)$ and $h'(n)$ are the inverse Fourier transform of the transfer functions $H(\theta)$ and $H'(\theta)$ defined in the expressions (43) and (45).

Starting from uncorrelated input data, so that $$E[x(n)x^*(n+k)] = \delta(k) \quad (49)$$

the normalization constraints can be represented as follows (1) equal power on the line if $$\frac{1}{2\pi} \int_{-\pi}^{+\pi} \left| G^2(\theta) \right| d\theta = \frac{1}{2\pi} \int_{-\pi}^{+\pi} \left| G(\theta)^2 | B_s(\theta + \theta_c) \right|^2 d\theta \quad (50)$$

and (2) an output signal which is desired to be equal if $$h(0) = h'(0) \quad (51)$$

The smearing efficiency is defined with reference to the impulsive noise model already introduced for baseband $$p'(n) = k\delta(n - n_o) \quad (52)$$

for the impulsive noise $p(n)$ shown in the FIGS. 18a and 18b. Let it be assumed that the interval between the noise pulses exceeds the duration of the impulse response of the filters. The accent notation further designates an impulsive noise of a shorter duration than the sampling period $\tau$.

For the equivalent circuit diagram shown in FIG. 18a of the transmission system without smearing and desmearing filters, the input signal $v(n)$ of the filter 62 is then equal to $$v(n) = u(n) + p(n)$$

which results in an output signal $t(n)$ having a frequency spectrum equal to $$T(\theta) = H(\theta) X(\theta) + \frac{1}{6} \sum_{k=0}^{5} G\left(\frac{\theta + 2k\pi}{6}\right) \quad (53)$$

$$P\left(\frac{\theta + 2k\pi}{6} + \theta_c\right)$$

From this it follows that for $p(n)$ given by (52), the corresponding response is equal to $$t(n) = (x*h)(n) + Ke^{-jn_o\theta_c}g(6n - n_o) \quad (54)$$

where $$(x * h)(n) = \sum_k x(k) h(n - k) \quad (55)$$

is the convolution of the input signal $x(n)$ with the effective overall equivalent impulse response $h(n)$ of the system.

Similarly, it holds for the equivalent circuit diagram shown in FIG. 18b of the transmission system comprising smearing and desmearing filters, that the output signal $t'(n)$ is equal to $$t'(n) = (x*h')(n) + Ke^{-jn_o\theta_c}(g*b_d)(6n - n_o) \quad (56)$$

wherein $h'(n)$ is the effective overall impulse response of the systemm corresponding to the transfer function $H'(\theta)$ in accordance with (45) and $\bar{b}_d(n)$ in accordance with (47).

Expression (56) can be written as $$t'(n) = (x*h)(n) + (x*\mu)(n) + Ke^{-jn_o\theta_c}(g*\bar{b}_d)(6n - n_o) \quad (57)$$

where $\mu(n) = h'(n) - h(n)$.

Expression (57) distinctly shows that two types of interferences are present in the output signal $t'(n)$, namely the intersymbol interference caused by the non-ideal matching of the smearing and desmering filters given by the term $(x*\mu)(n)$ and the smeared noise pulse $p(n)$ defined by the term $Ke^{-jn_o\theta_c}(g*\bar{b}_d)(6n - n_o)$.

Comparing (54) with (57) gives, as the first merit factor $F_1'$ of the speech band system, the accent notation indicating that $F_1$ for the impulse noise given by (52) is valid (1) the smearing efficiency $$F_1' = \frac{\max_n |g(n)|}{\max_n |(g * b_d)(n)|} \quad (58a)$$

This factor indicates by which factor the maximum value of a disturbance in the output signal is reduced by including the smearing filter 59 and the desmearing filter 61 in the transmission system. Since $n_o$ is chosen randomly, $6n - n_o$ may have any random value and, in (58a), the maximum overall values of n must be determined.

Comparing (54) with (57) gives as the second merit factor $F_2$.

(2) the signal relative to the self-generated intersymbol interference $$F_2 = \frac{h(0)}{\sqrt{\sum_n |\mu(n)|^2}} \qquad (59)$$

where $$h(0) = \max_n |h(n)|$$

Instead of the shape of the impulsive noise shown in the expression (52), it is alternatively possible to have impulsive noise consisting of two consecutive pulses of equal amplitudes but of opposite polarities, denoted as bipolar pulses in the sequel, denoted by ''. For this it holds that $$p''(n) = K(\delta(n - n_o) - \delta(n - n_o - 1)) \qquad (60)$$

For such an impulsive noise, the output signal is $$t(n) = (x*h)(n) + Ke^{-jn_o\theta_c}\{(g(6n - n_o) - e^{-j\theta_c}g(6n - n_o - 1))\} \qquad (61)$$

if no smearing and desmearing filters are used, and equal to $$t'(n) = (x*h')(n) + Ke^{-jn_o\theta_c}[(g*\tilde{b}_d)(6n - n_o) - e^{-jn\theta_c}(g*b_d)(6n - n_o - 1)] \qquad (62)$$

when such filters are indeed incorporated in the system. This produces as the first merit factor $F_1''$.

(d) The smearing efficiency for bipolar pulses $$F_1'' = \frac{\max_n |g(n) - e^{-j\theta_c}g(n - 1)|}{\max_n |(g*b_d)(n) - e^{-j\theta_c}(g*b_d)(n - 1)|} \qquad (58b)$$

So generally, the first merit factor $F_1$ is given by $$F_1 = \frac{\max_n |(\tilde{p}*g)(n)|}{\max_n |(\tilde{p}*\tilde{b}_d*g)(n)|} \qquad (63)$$

wherein $\tilde{p}(n) = p(n)e^{-j\theta_c n}$ and $\tilde{b}_d$ according to (47). For $p(n)$ given by (52) this changes into (58a), for $p(n)$ given in (60) this changes into (58b) and for the baseband mode, for which it holds that $g(n) = \Delta(n)$ and $\theta_c = 0$, (6b) is obtained.

It will be obvious that the first merit factor may have many values, each adapted to a special model of the impulsive noise.

It will be demonstrated with reference to the factors $F_1'$ and $F_1'$ and $F_2$ that substantially optimum filter coefficients $b_d(n)$ can be determined consisting of elements of the set $\{-1, 0+1\}$.

To define the coefficients $b_s(n)$ of the smearing filter and the coefficients $b_d(n)$ of the desmearing filter, this determination will be based on filters having the same coefficients but in the inverse sequence, namely $$b_d(n) = b_s(N_o - n) \qquad (64)$$

for any value of $N_o$ and for all values of n.

This choice has two advantages:

(1) only one set of coefficients need to be stored in the transmitter or in the receiver, respectively, in a duplex transmission system, and (2) for any given sequence of coefficients of the desmearing filter, the sequence of the smearing filter coefficients determined therefor gives the maximum smearing efficiency, for example, a maximum of the first merit factor $F_1'$. This can be demonstrated as follows.

Starting from normalized transmit and receive filters such that $$\sum_n g^2(n) = 1 \qquad (65)$$

The dependency of $F_1'$ which, in accordance with expression (58) seemingly only depends on the coefficients of the desmearing filter, also depends on the smearing filter, more specifically, because of the normalizations in accordance with (50) and (51). To make this stand out more clearly, $b_d(n)$ is split into two terms as follows $$b_d(n) = K_d c_d(n) \qquad (66)$$

wherein $K_d$ is a real positive gain which is chosen such that $$\max_n |(g*\tilde{c}_d)(n)| = 1 \qquad (67)$$

wherein $\tilde{c}_d = c_d(n)e^{-jn\theta_c}$ and $c_d(n)$ represents the form of the desmearing filter.

Expression (58) can then be written, using expression (66), as $$F_1' = \frac{g(0)}{K_d} \qquad (68)$$

which has a maximum for a minimum value of $K_d$. For a given desmearing filter, that is to say given values of $c_d(n)$, this can only be accomplished by selecting a smearing filter for which $K_d$ is minimal.

To obtain the corresponding coeficients, the expressions (50) and (51) are written as follows, using the normalization of the transmit and receive filters in accordance with (65) and Parseval's relation:

$$h(0) = \frac{1}{2\pi} \int_{-\pi}^{+\pi} G^2(\theta) \, d\theta = 1 \qquad (69)$$

$$h'(0) = \frac{1}{2\pi} \int_{-\pi}^{+\pi} G^2(\theta) B_s(\theta + \theta_c) B_d(\theta + \theta_c) \, d\theta = 1 \qquad (70)$$

and $$\frac{1}{2\pi} \int_{-\pi}^{\pi} G^2(\theta) |B_s(\theta + \theta_c)|^2 \, d\theta = 1 \qquad (71)$$

In these expressions, use is also made of the symmetry of the impulse responses $g(n)$ of the transmit and receive filters as is defined in (37), which has for its result that $G(\theta)$ has real values.

Applying the Cauchy-Schwarz inequality to expression (70) gives that $$1 = \left| \frac{1}{2\pi} \int_{-\pi}^{+\pi} G^2(\theta) B_s(\theta + \theta_c) B_d(\theta + \theta_c) d\theta \right|^2 \leq \quad (72)$$

$$\frac{1}{2\pi} \int_{-\pi}^{+\pi} G^2(\theta) |B_s(\theta + \theta_c)|^2 d\theta \cdot$$

$$\frac{1}{2\pi} \int_{-\pi}^{+\pi} G^2(\theta) B_d(\theta + \theta_c)^2 d\theta$$

wherein the sign of equality is only valid when $$G(\theta) B_s(\theta + \theta_c) = G(\theta) B_d^*(\theta + \theta)_c \quad (73)$$

It follows from (71) and (72) after introduction of $$B_d(\theta + \theta_c) = K_d C_d(\theta + \theta_c)$$

that $$K_d^2 > \frac{1}{\frac{1}{2\pi} \int_{-\pi}^{+\pi} G^2(\theta) |C_d(\theta + \theta_c)|^2 d\theta} \quad (74)$$

For a given form of the desmearing filter, the right-hand side of (74) has a predetermined value. So the minimum value of $K_d$ is obtained when the sequence $b_s(n)$ is chosen such that sign of equality is valid, which is compatible with (73). Expression (73) does not fully specify the filter as it only relates $B_s(\theta+\theta_c)$ to $B_d(\theta+\theta_c)$ in areas where $G(\theta) \neq 0$. In the areas wherein $G(\theta)$ is equal to zero, $B_s(\theta+\theta_c)$, and consequently $B_d(\theta+\theta_c)$, can be chosen randomly since this choice does not affect the signals which are important for the transmission of the system. Therefore, the optimum choice is to take $B_s(\theta+\theta_c) = B_d^*(\theta+\theta_c)$ for all values of $\theta$, which proves (64).

For that choice the sign of equality in (74) is valid, which with the aid of Parseval's relation can be written as:

$$K_d^2 = \frac{1}{\Sigma |(q * \tilde{c}_d)(n)|^2} \quad (75)$$

Under the constraint defined in (67), it can be seen that $K_d$ can be reduced by increasing all those values of $|(g * \bar{c}_d)(n)|$ which do not have their maximum value. It therefore holds that the greater the number of values of $|(g * \bar{c}_d)(n)|$ which have an amplitude near their maximum (i.e. unity), the better the properties of the filter.

Starting from a length of the filters $b_d(n)$ and $g(n)$ equal to N and M, respectively, the length of $(g * \bar{b}_d)$ is equal to $N+M-1$, so that (75) can be written as $$K_d^2 \geq \frac{1}{N+M-1} \quad (76)$$

This gives a maximum value for $F_1'$ given by $$F_1' \leq |g(0)| \sqrt{N+M-1} \quad (77)$$

This value is only obtained when $$|(g * \bar{c}_d)(n)| = 1 \quad (78)$$

for all values of n over the length of the filter. If $g(n)$ is a low-pass filter and $g(n)$ is consequently small at the edges (for example for $|n| \approx M/2$), this requires very significant changes in $c_d(n)$, which gives a lower value for the second merit factor $F_2$.

The value as defined in (77) is consquently not suitable for use any more. It is a better choice to assume $|(g * \bar{c}_d)(n)|$ can be approximately kept constant over the length of the impulse response of the smearing filter, which gives an estimated maximum value of the smearing efficiency of $$F_1' \leq |g(0)| \sqrt{N} \quad (79)$$

To illustrate an embodiment, use is made of a method which is different from the method shown for the baseband system for searching for long binary or ternary sequences, which produce high merit factors $F_1'$ or $F_1''$ and $F_2$ for the speech band system. This method will be described more specifically for lengths of the smearing filter and of the desmearing filter equal to 64 to 128, although this method can be used for any length of the filters. In addition, sequences having binary coefficients obtained in accordance with this method may alternatively be used for the basband system.

(a) Binary sequences

The description of based on binary sequences defined by the expression $$b(n) = \text{sign}\left( \sin\left( n(n+1) \frac{\pi}{2N} + p \right) + r(n) \right) \quad (80)$$

for $0 \leq n \leq N-1$, where sign(x) is equal to 1 when $x > 0$ and $-1$ when $x < 0$, and where p is any random phase in the range from $0 \leq p \leq \pi$, and $r(n)$ is any random white stochastic procedure with uniform amplitude distribution, which satisfies the requirement that $$P_{r(n)}(r) = \begin{cases} \frac{1}{2} & |r| \leq 1 \\ 0 & |r| > 1 \end{cases} \quad (81)$$

When the second merit factor of such a generated sequence $b(n)$ is sufficiently high, the following change procedure is used.

Check whether changing $b(n)$ for a given n into its complement, so $-1 \rightarrow +1$ or the other way around, gives a higher value for the merit factor $F_2$ or not. If yes, then $b(n)$ is replaced by its complementary value. This is effected for all the values of n. Thereafter the change procedure is repeated until no further improvement of the value of $F_2$ is obtained anymore. The sequences thus obtained, with the best merit factor $F_2$, are particularly suitable for use in the baseband system. For the speech band, a better method, adapted for this frequency band can be used. Adapting the expression (80) to this frequency range is effected as follows. The signal sin $n(n+1)\pi/2N$ is a frequency-modulated signal and has the instantaneous frequency $$\theta(n) = n\pi/N$$

$$0 \leq n \leq N-1$$

So, over the length of the impulse response $b(n)$, this frequency is varied over the range $0 \leq \theta(n) \leq \pi$ $0 \leq n \leq N-1$ (82)

In the speech band which was selected as an embodiment of the modulation band, the instantaneous frequency of the impulse response of the desmearing filter needs only to be varied over the frequency range $\theta_1 \leq \theta(n) \leq \theta_2$ $0 \leq n \leq N-1$ (83)

wherein $\theta_1$ and $\theta_2$ are the normalized cut-off frequencies of the band of the system, for example, those of the impulse response g(n) of the receiver filter. Limiting the frequency range from 1000 Hz $\leq$ f $\leq$ 2600 Hz, so a choice of $$\theta_1 = \frac{1000}{9600} 2\pi = 5\pi/24$$

and $\theta_2 = 13\pi/24$, has the advantage that a higher value of the first merit factor $F_1$ can be realized. However, in practice, the filter g(n) is not an ideal low-pass filter, and has contributions over a larger frequency range, so that the above-mentioned choice for $\theta_1$ and $\theta_2$ does not yield an optimum value for the second merit factor $F_2$. If normalized frequency limits $\theta_1$ and $\theta_2$ are introduced, then better optimum values can be obtained for the merit factors by having $\theta_1$ vary and obtaining $\theta_2$ from $\theta_c - \theta_1 = \theta_2 - \theta_c$ (84)

where $\theta_c$ is the center frequency of the band-pass filter of the signal, which in the embodiment corresponds to $\theta_c = 2\pi 1800/9600 = 3\pi/8$. The sequences b(n) generated in this way are defined by the relation $b(n) = \text{sign}(\sin((n_1+n)(n_1+n+1)\beta + p) + r(n))$ (85)

where $n = 0, 1, \ldots, N-1$, $\beta = \pi(f_2 - f_1)/(N-1)f_s$, where $f_1 = \frac{\theta_1 f_s}{2\pi}$, $f_2 = \frac{\theta_2 f_s}{2\pi}$ and $f_s = 1/\tau$ $n_1$ is equal to the largest integer less than or equal to $\pi f_1/\beta f_s$, p is a random phase angle in the range from $8 \leq p < \pi$, and r(n) is a random white procedure given by (81).

So $n_1$ and $\beta$ are chosen such that the instantaneous frequency $\theta(n) = 2(n+n_1)\beta$, of the impulse response b(n) is defined by $\theta(0) \approx \theta_1$, $\theta_1 < \theta(n) < \theta_2$ for $0 < n < N-1$ and
$\theta(N-1) \approx \theta_2$.

This implies that the instantaneous frequency $\theta$ satisfies (83).

Table I contains the binary values of b(n) for a filter having 64 coefficients and the associated values of the merit factors $F_1'$, $F_1''$ and $F_2$, which are obtained by means of the above-mentioned procedure in said speech band system, the sequence which provides the highest value of $F_2$ being shown.

Figure 19A:
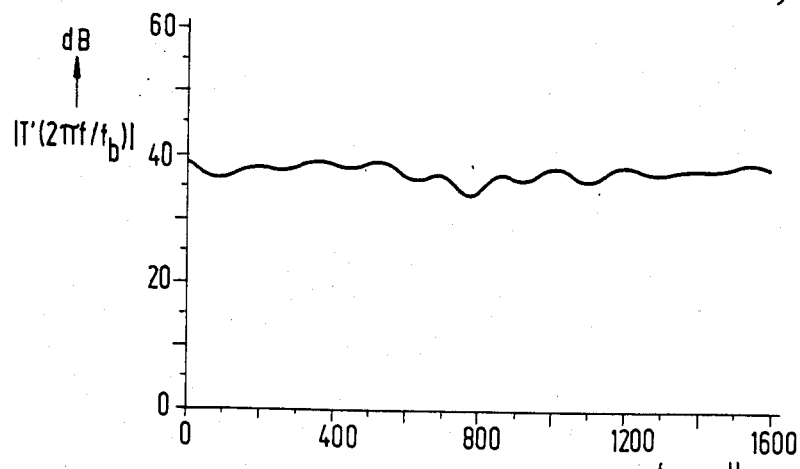
FIG. 19a shows the amplitude spectrum of the equivalent overall impulse response of the system comprising a smearing filter and a desmearing filter with binary coefficients.

FIG. 19a shows the amplitude spectrum of the decimated overall equivalent impulse response t'(n) (FIG. 18b), the coefficients of the desmearing filter and consequently also of the smearing filter being given by the above-mentioned binary sequence having 64 coefficients.

Figure 19B:
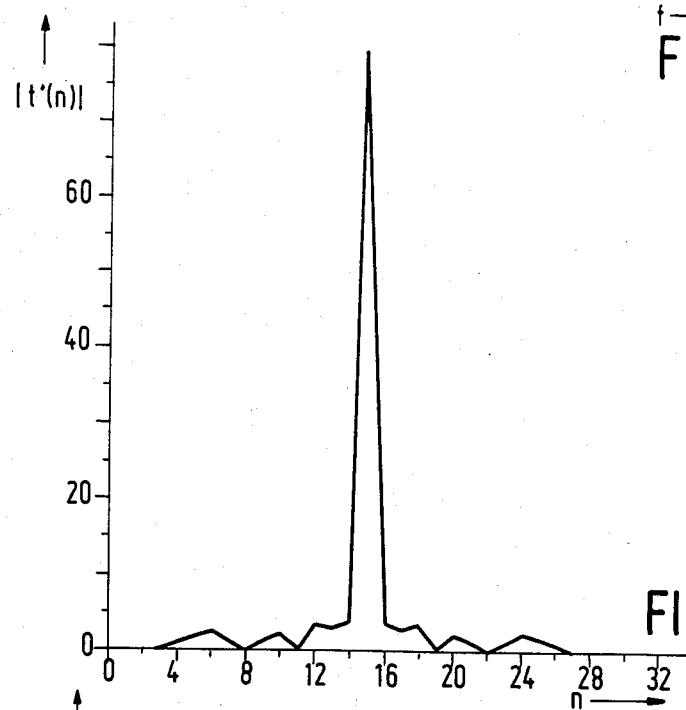
Figure 19C:
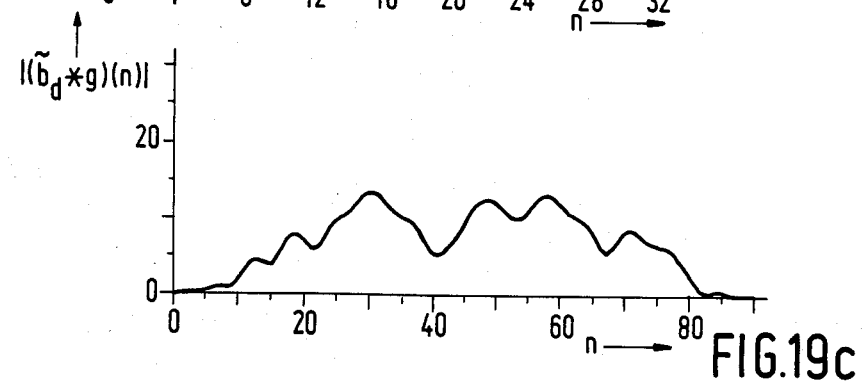

Although binary coefficients have been used for obtaining a simple filter the characteristic is still rather flat. FIG. 19b shows the decimated overall equivalent impulse response t'(n) of the transmission system, which has only low side-lobes, and FIG. 19c shows the amplitude of the smeared impulse response $|(g*\bar{b}_d)(n)|$. However, this characteristic shows a variation which is not too flat. It is possible to increase the merit factors $F_1$ by using longer smearing and desmearing filters. If high values are desired for the merit factors $F_2$ then it is possible to use for the coefficients b(n), while maintaining the simple realization of the filters:

(c) ternary sequences

For the coefficients b(n), it then holds that b(n) $\in \{-1, 0, 1\}$ and the sequence comprises at least one of all the three different elements of the set. Such sequences can be realized by starting from the sequences generated by the expressions (80) or (85) and altering the change procedures such that not only changes from +1 to -1 and vice versa are considered but also transitions from +1 or -1 to zero and vice versa.

Table II shows ternary sequences b(n) found in the above-described way for the coefficients of the filter, both for a filter having 64 coefficients as for a filter having 128 coefficients. In both cases, five of these sequences which produce the best merit factors $F_1'$, $F_1''$ and $F_2$, respectively are shown, arranged according to these merit factors.

As will be apparent from these Tables, for ternary sequences an improvement of the second merit factor $F_2$ is obtained compared with binary sequences, the first merit factor $F_1'$, remaining the same, by an amount of $\pm 4,5$ dB for by-coefficient filter and of $\pm 6,5$ dB for a 128-coefficient filter. This in contradistinction with the baseband for which, as was already demonstrated herein before, the binary sequences are optimum. If, according to the requirements, the intersymbol interference must be very low, for example, the second merit factor $F_2$ must exceed 20 dB so as to provide an adequately low BER, then it appears that the majority of the sequences shown in Table II are suitable for use. Which sequence is chosen for the coefficients of the filter depends on the fact whether the impulsive noise consists of unipolar pulses, of bipolar pulses or of both types. As the coefficients in the case of a digital construction of the filters can be stored in a store, adequately matching the filters to the noise occurring on a transmission path only consists of entering the desired set of coefficients into the store, or if a plurality of sequences can be stored in the store, of selecting the desired sequence of coefficients.

Figure 20A:
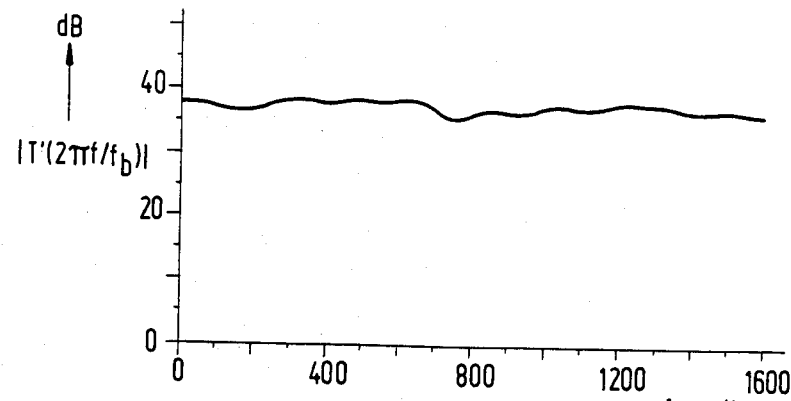
FIG. 20a shows the amplitude spectrum of the equivalent overall impulse response of the system comprising a smearing filter and a desmearing filter having ternary coefficients used in the system of FIG. 12.
Figure 20B:
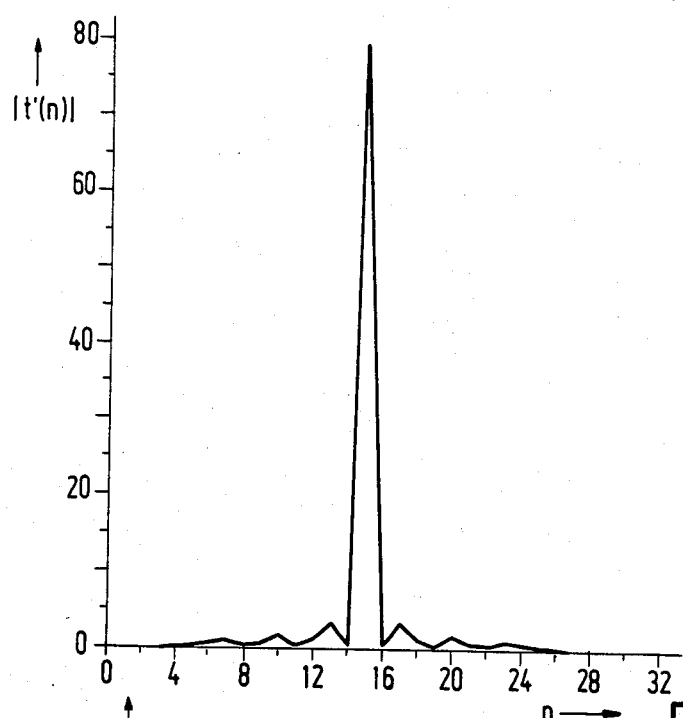
FIG. 20b shows the overall impulse response of the system of FIG. 12 comprising a smearing filter and a desmearing filter as shown in FIG. 19b.
Figure 20C:
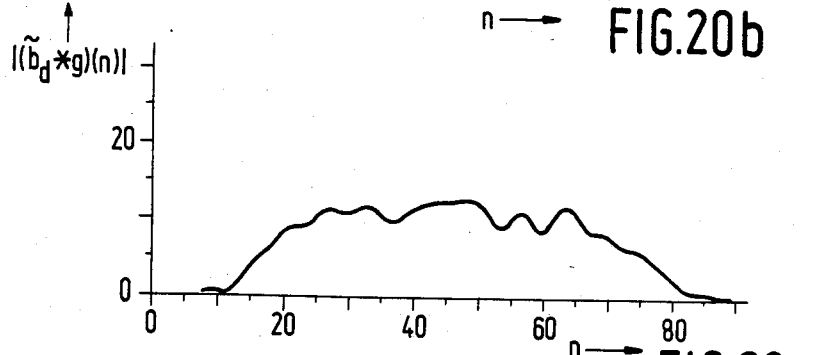

FIGS. 20a, 20b and 20c show, respectively, the absolute value of the frequency spectrum of the decimated equivalent overall impulse response, the absolute value of the decimated overall impulse response, and the absolute value of the smeared impulse response associated with the system, shown in FIG. 18b, a ternary sequence of a coefficients having a length of 64 and the merit factors $F_1 = 9.18$ dB, $F_2 = 21.40$ dB and $F_3 = 8.17$ dB are chosen as coefficients of the desmearing filter and of the smearing filter. This sequence, shown in Table II which has the fourth best second merit factor, is one of the most suitable sequences for smearing unipolar noise pulses and has an adequate operation for smearing bipolar noise pulses. This will particularly be obvious from the rather flat variation of the smearing impulse response of a noise pulse on the transmission path, as shown in FIG. 20c.

TABLE I

A binary sequence for a filter having 64 coefficients and the associated merit factors.

$F_1' = 2.605 (= 8.32 \text{ dB})$  $F_2 = 7.292 (= 17.26 \text{ dB})$  $F_1'' = 2.343 (= 7.40 \text{ dB})$

```
−1 −1 −1 −1 −1 +1 +1 +1 +1 +1 +1 −1 −1 −1 −1 +1 +1 +1 −1 −1 −1
+1 +1 +1 +1 −1 −1 +1 −1 +1 +1 −1 −1 +1 +1 +1 −1 −1 −1 +1 +1
−1 −1 +1 +1 +1 −1 −1 +1 +1 −1 −1 +1 +1 −1 +1 +1 +1 −1 +1 +1
+1 −1 +1 +1
```

TABLE II

Ternary sequences for a filter with 64 coefficients and the associated merit factors.

The five best sequences found with regard to the first merit factor $F_1'$

$F_1' = 2.887 (= 9.21 \text{ dB})$  $F_2 = 10.660 (= 20.56 \text{ dB})$  $F_1'' = 2.310 (= 7.27 \text{ dB})$
```
 0  1  0  1  0 −1 −1 −1 −1  1  1  1  1  0 −1 −1 −1  0  1  1
 1 −1 −1  0  1  1  1 −1 −1  1  1  1 −1 −1 −1  1  0 −1 −1 −1
 0  0 −1 −1  1  1 −1 −1  1  1 −1 −1  0  1 −1 −1  0  1 −1 −1
 1  0 −1  1
```

$F_1' = 2.881 (= 9.19 \text{ dB})$  $F_2 = 9.354 (= 19.42 \text{ dB})$  $F_1'' = 2.282 (= 7.17 \text{ dB})$
```
−1  0 −1  1  0  1  1  0  0 −1 −1 −1  0  1  0  1 −1 −1 −1 −1
 0  1  1  0 −1 −1 −1  1  1  1 −1 −1  0  1  1 −1 −1 −1 −1  1  1
 1 −1  0  1  1 −1 −1  1  1 −1 −1  1  1 −1 −1  1  0 −1 −1  1
−1 −1  1 −1
```

$F_1' = 2.876 (= 9.18 \text{ dB})$  $F_2 = 11.745 (= 21.40 \text{ dB})$  $F_1 = 2.562 (= 8.17 \text{ dB})$
```
 0  0  1 −1  0 −1 −1  0  1  1  1  1 −1 −1 −1 −1  1  1  1  1
−1 −1  0  0  1  1 −1 −1 −1  1  1 −1 −1 −1  1  1  1 −1 −1  0
 1 −1 −1  0  1  1 −1  1  1  1 −1 −1  1  0 −1 −1  1  0 −1  0
 1  0 −1  1
```

$F_1' = 2.867 (= 9.18 \text{ dB})$  $F_2 = 9.069 (= 19.15 \text{ dB})$  $F_1'' = 2.549 (= 8.13 \text{ dB})$
```
−1 −1 −1 −1  0  1  0  1 −1 −1 −1 −1 −1  1  1  1  0 −1 −1 −1
 1  1  1  0  0  0 −1  1  1 −1 −1  1  1  1 −1 −1  1  0  1  1
−1 −1  1  1  0 −1 −1  1  0 −1 −1  1  1 −1  0  1  0 −1  0  1
 0 −1  1  1
```

$F_1' = 2.850 (= 9.10 \text{ dB})$  $F_2 = 10.233 (= 20.20 \text{ dB})$  $F_1'' = 2.258 (= 7.07 \text{ dB})$
```
 1  1  1  1 −1 −1 −1 −1  1  0  1  1  1  0  0 −1  0  1  1  1  0
−1 −1  0  1  0  1 −1  0  0  1  1 −1 −1 −1  1  1  1  0 −1  0  1
 1  1 −1  0  1  1 −1 −1  1  1 −1 −1  1  1 −1 −1  1 −1 −1 −1
 1 −1 −1  1
```

The five best sequences found with regard to the second merit factor $F_2$.

$F_1' = 2.552 (= 8.14 \text{ dB})$  $F_2 = 12.343 (= 21.83 \text{ dB})$  $F_1'' = 2.191 (= 6.81 \text{ dB})$
```
 1  0  0  1 −1  0  1  0  1  1  0 −1 −1  0 −1  1  1  1  0  0
−1 −1  0  1  1  0  0 −1 −1  1  1  1 −1  1  1  1 −1 −1 −1 −1
 1  1 −1 −1  1  1 −1 −1  1  1 −1 −1  1  1 −1  1  1  1  0  1  0
 1  1 −1  1
```

$F_1' = 2.608 (= 8.33 \text{ dB})$  $F_2 = 11.793 (= 21.43 \text{ dB})$  $F_1'' = 2.495 (= 7.94 \text{ dB})$
```
 0  1 −1  0 −1 −1  0  1  1  1  1  0 −1 −1 −1 −1  0  1  1
 0 −1 −1  1  1  1 −1 −1 −1  1  1  0 −1 −1  1  1  1  0  1  1
 1  1 −1  1  1  0 −1 −1  1  0 −1 −1  1  0 −1  0  1  0 −1  0
 1  0 −1  1
```

$F_1' = 2.876 (= 9.18 \text{ dB})$  $F_2 = 11.745 (= 21.40 \text{ dB})$  $F_1'' = 2.562 (= 8.17 \text{ dB})$
```
 0  0  1 −1  0 −1 −1  0  1  1  1  1 −1 −1 −1 −1  1  1  1  1
−1 −1  0  0  1  1 −1 −1 −1  1  1 −1 −1 −1  1  1  1 −1 −1  0
 1 −1 −1  0  1  1 −1  1  1  1 −1 −1  1  0 −1 −1  1  0 −1  0
 1  0 −1  1
```

$F_1' = 2.519 (= 8.02 \text{ dB})$  $F_2 = 11.620 ("21.40 \text{ dB}")$  $F_1'' = 2.618 (= 8.36 \text{ dB})$
```
 0  0  0  0 −1 −1  0 −1  1  1  0  1  0 −1 −1 −1 −1  1  1  1
 0 −1 −1 −1  1  1  1 −1 −1  0  0  1 −1 −1 −1  1  1  1 −1  1
 1  0 −1 −1  0  1  0 −1  1  1  1 −1  0  1 −1 −1  0  1 −1  0
 1  1 −1  1
```

$F_1' = 2.523 (= 8.04 \text{ dB})$  $F_2 = 11.546 (= 21.25 \text{ dB})$  $F_1'' = 2.250 (= 7.04 \text{ dB})$
```
 1  1  1  1  0  0 −1 −1  1 −1  1  1  0  0 −1 −1 −1  0  1  1
−1 −1 −1 −1  1  0  1 −1  0 −1  1  1 −1 −1 −1  0  1  1 −1 −1
 1  1 −1 −1  1  1  1  0  0  1  1 −1 −1  1 −1 −1  0  1 −1 −1
 1  0 −1  0
```

The five best sequences found with regard to the first merit factor $F_1''$

$F_1' = 2.845 (= 9.08 \text{ dB})$  $F_2 = 8.956 (= 19.04 \text{ dB})$  $F_1'' = 2.859 (= 9.12 \text{ dB})$
```
−1 −1 −1 −1  0  1  1  1  1  1 −1 −1 −1 −1  1  1  1  0 −1 −1
−1  1  1  1  0 −1 −1  1  1 −1 −1 −1 −1  1  1 −1  0  1  1  0
−1  0  0  1 −1 −1  0  1  0 −1  0  1  0 −1  1  1  0 −1  1  1
 0 −1  1  0
```

$F_1' = 2.836 (= 9.05 \text{ dB})$  $F_2 = 10.028 (= 20.02 \text{ dB})$  $F_1'' = 2.769 (= 8.85 \text{ dB})$
```
 1 −1  0 −1 −1 −1  1  1  1  1  1 −1 −1 −1  0  1  1  1 −1 −1
```

TABLE II-continued

```
-1  0  1  0  1  0 -1  1  1  1 -1 -1 -1  1  1  0 -1 -1  1  1
-1 -1  0  0  1 -1 -1  1  1 -1 -1  1  0 -1 -1  1 -1 -1 -1  1
 0 -1  1  1
```
$F_1' = 2.778 (= 8.87$ dB$)$  $F_2 = 10.030 (= 20.02$ dB$)$  $F_1'' = 2.747 (= 8.78$ dB$)$
```
 0 -1 -1 -1  0  0  1  1  1  1 -1 -1 -1  0  1  1  1 -1 -1
-1 -1  1  1  0 -1 -1 -1  1  1 -1 -1  0  1  0  0 -1 -1  1 -1
-1 -1 -1  1  0 -1 -1  1  0 -1 -1  1 -1 -1 -1  1 -1 -1  0  1
 1 -1  1  1
```
$F_1' = 2.813 (= 8.98$ dB$)$  $F_2 = 9.865 (= 19.88$ dB$)$  $F_1'' = 2.725 (= 8.71$ dB$)$
```
 0  0 -1 -1 -1 -1  1  1  1  1 -1 -1 -1  0  0  1  1 -1
-1 -1  0  0  1  1 -1 -1  0  1  1  0 -1 -1  1  1  1 -1  0  1
 1  1 -1  1  1  1  0 -1  1  1 -1  0  1  1  0  0  1  1 -1 -1
 1 -1 -1  0
```
$F_1' = 2.659 (= 8.49$ dB$)$  $F_2 = 9.171 (= 19.25$ dB$)$  $F_1'' = 2.699 (= 8.62$ dB$)$
```
 0 -1  0  0 -1  1  0  0  1  0 -1 -1 -1  1  1  1 -1 -1
-1  0  1  1  1 -1 -1  0  1 -1 -1 -1 -1  1  1 -1 -1  1  0  0
-1 -1 -1  1 -1 -1 -1  1  0 -1  1  1  1 -1  1  1  0 -1  0  1
 0 -1  1  0
```

Ternary sequences for a filter with 128 coefficients and
the associated merit factors F.
The five best sequences with regard to the first merit factor $F_1' = 3.911 (= 11.85$ dB$)$ $F_2 = 11.193 (= 20.98$ dB$)$  $F_1'' = 3.227 (= 10.18$ dB$)$
```
 0  1  1  1  1  0 -1 -1 -1 -1  0  1  1  0  1 -1 -1 -1  0  0
 1  1  1 -1 -1 -1 -1  0  1  1  1 -1 -1 -1 -1  1  1 -1 -1 -1
 0  1  1  1  0 -1  0  0  1  1  1 -1 -1  0  1  1  0 -1 -1  1
 1  1 -1 -1  1  1  1 -1  0  1  1 -1 -1  1  0  1  1 -1  0  0
 1  0 -1  0  1 -1  0 -1  0  0 -1 -1 -1  1 -1 -1 -1  1  1 -1
-1  1  1 -1 -1  0  1 -1 -1  1  1 -1 -1  1  1  0 -1 -1  1  0 -1
 0  1 -1 -1  0  0 -1  0
```
$F_1' = 3.883 (= 11.78$ dB$)$ $F_2 = 10.232 (= 20.20$ dB$)$  $F_1'' = 3.158 (= 9.99$ dB$)$
```
-1  1  0 -1  1 -1 -1 -1 -1 -1  1  0  1  1  1 -1 -1 -1
 1  1  1  0 -1 -1 -1 -1  1  1  1  1 -1 -1  0 -1  1  1  1  0
-1 -1 -1  1  1 -1 -1 -1  0  1  1 -1 -1 -1 -1  1  1  0  1 -1
 0  1  1 -1 -1 -1  1  1  1  1  0 -1  1  1  0 -1 -1  1 -1 -1
-1  1  1  1 -1  0  1  1 -1 -1  0  0 -1  1  1  0 -1  0  1  1
-1 -1  1  1 -1 -1  1  1  1  0  1  1 -1  0  0  0  0  1  1
-1  1  1 -1 -1  1 -1 -1 -1
```
$F_1' = 3.840 (= 11.69$ dB$)$ $F_2 = 9.597 (= 19.64$ dB$)$  $F_1'' = 3.104 (= 9.84$ dB$)$
```
 1  1  1  1  0 -1 -1 -1  0  0  1  0  0 -1 -1 -1  0  1  0
 1  0  0 -1 -1 -1 -1  1  1  0  0 -1 -1  1  1  1 -1 -1  0
 0  1  1 -1  0 -1  1  1  1  1 -1 -1 -1  1  0  0 -1 -1  1
 1  1 -1  0  0  1  0 -1 -1  1  1 -1 -1  0  1  1  0 -1  1
 0  1 -1 -1  1  1 -1  0  1  0  1 -1  1  0  1  1  1 -1
-1  1  1 -1 -1  1  1 -1  0  1  0 -1  1  1 -1  0 -1 -1
 0  1 -1 -1  1  1 -1 -1  1
```
$F_1' = 3.803 (= 11.60$ dB$)$ $F_2 = 9.773 (= 19.80$ dB$)$  $F_1'' = 3.405 (= 10.64$ dB$)$
```
 0  0  0  1  1  1  0  0 -1 -1  0  1  1  1  1  0 -1 -1 -1
 1  1  1  1  0 -1 -1 -1  1  1  1  0 -1 -1 -1 -1  1  1  0  0
 0 -1  1  1  1 -1 -1 -1  0  1  1  0 -1 -1  0  0  1  0 -1 -1
 0  1  1 -1 -1  0  1  1  0 -1 -1  1  1 -1 -1 -1  1  1 -1 -1
 0  1  0 -1 -1  1  0  0 -1 -1  1 -1 -1 -1  1  0  0 -1 -1  1  0
-1 -1  0  1 -1 -1  1  1 -1  0  1  1 -1 -1  0 -1 -1  1  0
-1  1  1 -1  0  1  0 -1
```
$F_1' = 3.776 (= 11.54$ dB$)$ $F_2 = 9.600 (= 19.65$ dB$)$  $F_1'' = 3.335 (= 10.46$ dB$)$
```
-1 -1 -1  0  0  1  1  0 -1  0 -1  0  0  1  1  1  1  0 -1
 0 -1 -1  1  1  1  1  0 -1  0  1  1  1 -1 -1  0 -1  1
 1  0 -1 -1 -1  1  1  1  0 -1 -1  1  1  0  1 -1  1  1 -1
-1 -1  0  1  1 -1 -1 -1  1  1 -1  0 -1  1  0 -1  1  1  1
-1 -1  1  1  0 -1  0  1  1 -1 -1  1  1  0 -1  1  1  1 -1  1
 1 -1  1  1  0  1  1  0 -1  1  1 -1  1  0  0 -1 -1  1
-1 -1  0  1 -1  0  1 -1
```

The five best sequences found with regard to the second merit factor $F_2$.

$F_1' = 3.911 (= 11.85$ dB$)$ $F_2 = 11.193 (= 20.98$ dB$)$  $F_1'' = 3.227 (= 10.18$ dB$)$
```
 0  1  1  1  1  0 -1 -1 -1 -1  0  1  1  0  1 -1 -1 -1  0  0
 1  1  1 -1 -1 -1 -1  0  1  1  1 -1 -1 -1 -1  1  1 -1 -1 -1
 0  1  1  1  0 -1  0  0  1  1  1 -1 -1  0  1  1  0 -1 -1  1
 1  1 -1 -1  1  1  1 -1  0  1  1 -1 -1  1  0  1  1 -1  0  0
 1  0 -1  0  1 -1  0 -1  0  0 -1 -1 -1  1 -1 -1 -1  1  1 -1
-1  1  1 -1 -1  0  1 -1 -1  1  1 -1 -1  1  1  0 -1 -1  1  0 -1
 0  1 -1 -1  0  0 -1  0
```
$F_1' = 3.669 (= 11.29$ dB$)$ $F_2 = 10.418 (= 20.36$ dB$)$  $F_1'' = 3.340 (= 10.47$ dB$)$
```
 0  1  1  0  1 -1 -1 -1  0 -1  1  0  1  1  0 -1  0 -1  1
 1  1  1  0 -1 -1 -1  0  1  1  1 -1 -1 -1 -1  1  1  1  1  0
-1  0  0  1  0 -1 -1 -1  1  1  1  0 -1  0 -1  1  1 -1 -1  0
 1  1 -1 -1  1  1  0  0 -1  0  0 -1 -1  1  1 -1 -1 -1  1
 1  1  0 -1 -1  1  1  0 -1  1  1 -1  0  1  0 -1 -1 -1  1
-1  0  1  1  0  0  1  0 -1 -1  1 -1 -1 -1  1 -1  0  1  1 -1
 1  1  1 -1  1  0 -1
```
$F_1' = 3.684 (= 11.33$ dB$)$ $F_2 = 10,299 (= 20.66$ dB$)$  $F_1'' = 3.057 (= 0.71$ dB$)$
```
 0 -1  0  0  1  0 -1  0 -1 -1  1  1  1  1  0 -1 -1 -1  0
```

TABLE II-continued

```
 0  1  1  1  1  0 -1 -1 -1  0  1  1 -1 -1 -1 -1  0  1  1  0
 1 -1 -1  0  1  1  0 -1 -1 -1  1  1  1 -1 -1 -1  1  1  1 -1
-1  1  1  1  0 -1  1  1  1 -1 -1  0  0  1 -1 -1 -1  1 -1 -1
 0  1  1 -1  0  1  1  1 -1 -1  1  1  0 -1  1  1  0 -1  1  1
-1 -1  1  1 -1 -1  0  1 -1 -1  1  0  0 -1  1  1 -1  0  1 -1
-1  1 -1 -1 -1  1 -1  0
```

$F_1' = 3.883 (= 11.78$ dB$)$  $F_2 = 10.232 (= 20.20$ dB$)$  $F_1'' = 3.158 (= 9.99$ dB$)$

```
-1  1  0 -1  1 -1 -1 -1 -1 -1  1  0  1  1  1 -1 -1 -1
 1  1  1  0 -1 -1 -1 -1  1  1  1  1 -1 -1  0 -1  1  1  1  0
-1 -1 -1  1  1 -1 -1 -1  0  1  1 -1 -1 -1 -1  1  1  0  1 -1
 0  1  1 -1 -1 -1  1  1  1  0 -1  1  1  0 -1 -1  1  1 -1 -1
-1  1  1 -1 -1  0  1 -1 -1  0  0 -1  1  1  0 -1  0  1  1
-1 -1  1  1 -1 -1  1  1  0 -1  1  1 -1  0  0  0  0  0  1  1
-1  1  1 -1 -1  1  1 -1 -1
```

$F_1' = 3.489 (= 10.85$ dB$)$  $F_2 = 10.022 (= 20.02$ dB$)$  $F_1'' = 3.079 (= 9.77$ dB$)$

```
 0  0 -1 -1  0 -1  1  1  1  1  1 -1 -1 -1 -1  0  1  1  0  1
-1 -1 -1 -1  0  0  0 -1 -1 -1 -1 -1  1  1  1  1 -1 -1 -1  1
 1  1 -1 -1 -1  0  1  1  0 -1 -1 -1  1  1  1 -1 -1  1  1  1
 0  0 -1  1  1 -1  0  1  0 -1 -1  1  1  1 -1 -1  1  1  1
-1 -1 -1  1  1 -1  0  1  1  0 -1  1  0 -1 -1  1  0 -1 -1
 1  1 -1 -1  1  1 -1  0  1  1 -1  1  1  0 -1  1  1 -1 -1  1
 1 -1  0  1  0  0  0  0
```

The five best sequences found with regard to the first merit factor $F_1''$.

$F_1' = 3.667 (= 11.29$ dB$)$  $F_2 = 9.739 (= 19.77$ dB$)$  $F_1'' = 2.454 (= 10.77$ dB$)$

```
-1  0 -1  0 -1  0 -1  0  0  1  1  0  0 -1  0 -1  1  1  1
 1  0 -1 -1 -1 -1 -1  1  1  1  1 -1 -1 -1  0  1  1  1 -1 -1
-1 -1  1  1  0 -1 -1  0  1  1  1 -1 -1 -1  0  1  0 -1  0  0
 1  1 -1 -1  1  0  1 -1 -1 -1  1  1 -1 -1 -1  1  1  0 -1  0
 1  0 -1 -1  1  1  0 -1  1  1  1 -1  0  1  0 -1 -1  0  1 -1
-1  1  0 -1 -1  0  0 -1 -1  1  1 -1  1  1  1 -1  0  1 -1 -1
 1  0 -1  0  1  0 -1  1
```

$F_1' = 3.803 (= 11.60$ dB$)$  $F_2 = 9.773 (= 19.80$ dB$)$  $F_1'' = 3.405 (= 10.64$ dB$)$

```
 0  0  0  1  1  1  0  0 -1 -1  0 -1  1  1  1  0 -1 -1 -1
 1  1  1  1  0 -1 -1 -1 -1  1  1  0 -1 -1 -1 -1  1  1  0  0
 0 -1  1  1  1 -1 -1 -1  0  1  1  0 -1 -1  0  0  1  0 -1 -1
 0  1  1 -1 -1  0  1  1  0 -1 -1  1  1 -1 -1 -1  1  1 -1 -1
 0  1  0 -1 -1  1  0  0 -1 -1  1 -1 -1 -1  0  0 -1  1  0
-1 -1  0  1 -1 -1  1  1 -1  0  1 -1 -1  1  0 -1 -1  1  0
-1  1  1 -1  0  1  0 -1
```

$F_1' = 3.571 (= 11.06$ dB$)$  $F_2 = 9.831 (= 19.85$ dB$)$  $F_1'' = 3.359 (= 10.52$ dB$)$

```
 0  0  0  1  0  1  1  0  0 -1 -1 -1  1  1  1  1 -1 -1
-1  0  0  1  1  0 -1 -1 -1 -1  0  1  1  0 -1 -1 -1  0  1  0
 0 -1 -1  1  1  1  1  0 -1  0  0  1 -1 -1 -1 -1  0  1  1 -1
-1  0  1  1 -1  0 -1  1  1  1 -1 -1  1  1 -1 -1 -1 -1  1  1
-1  1  1  1 -1 -1  0  1 -1  0  1  1  1 -1  0  1 -1 -1 -1  0
 1  0 -1  1  1  0 -1  1  1 -1  1  1  1 -1  0  1 -1 -1  0  0
 0 -1  0  1 -1 -1  1 -1
```

$F_1' = 3.669 (= 11.29$ dB$)$  $F_2 = 10.418 (= 20.36$ dB$)$  $F_1'' = 3.340 (= 10.47$ dB$)$

```
 0  1  1  0  1 -1 -1 -1  0 -1  1  0  1  1  1  0 -1  0 -1  1
 1  1  1  0 -1 -1 -1  0  1  1  1 -1 -1 -1 -1  1  1  1  1  0
-1  0  0  1  0 -1 -1 -1  1  1  1  0 -1  0 -1  1  1 -1 -1  0
 1  1 -1 -1  1  1  0  0 -1  0  0  1 -1 -1  0  0  1 -1 -1 -1
 1  1  0 -1  1  1  1  0 -1  1  1  1 -1  0  1  0 -1 -1  1  1
-1  0  1  1  0  0  1  0 -1 -1  1 -1 -1 -1  1 -1  0  1  1 -1
 1  1  1 -1  0  1  0 -1
```

$F_1' = 3.776 (= 11.54$ dB$)$  $F_2 = 9.600 (= 19.65$ dB$)$  $F_1'' = 3.335 (= 10.46$ dB$)$

```
-1 -1 -1  0  0  1  1  0 -1  0 -1 -1  0  0  1  1  1  1  0 -1
 0 -1 -1  1  1  1  1  0 -1 -1  0  1  1  1  1  1  0 -1  1
 1  0 -1 -1 -1  1  1  1  0 -1  1  1  0  1 -1 -1  1  1 -1
-1 -1  0  1  1 -1 -1 -1  1  1 -1  0 -1  1  0 -1  1  1  1
-1 -1  1  1  0 -1  0  1  1 -1 -1  1  1  0 -1  1  1  1 -1  1
 1 -1  1  1  0 -1  1  1  0 -1  1  1 -1  1  0  0 -1 -1  1
-1 -1  0  1 -1  0  1 -1
```

What is claimed is:

1. A data transmission system comprising a transmitter and a receiver coupled thereto via a transmission path, the transmitter comprising a transversal smearing filter and the receiver comprising a transversal desmearing filter, each of said filters having a substantially flat amplitude transmission function, one of said filters having an overall increasing group delay time as a function of frequency, and the other of said filters having an overall decreasing group delay time as a function of frequency, whereby the sum of said group delay times for both filters is substantially constant, the transversal filters each comprising a plurality of series-arranged delay elements, each having a time delay of the same duration as a sampling period of an input signal, and a signal processing arrangement coupled to taps arranged between every two consecutive delay elements for, during at least each symbol interval T, multiplying the signals present on the taps by individual coefficients determined for each tap, forming respective product signals, and summing the respective product signals thus obtained, characterized in that the sequence of coefficients $b_d(n)$ $n=0, 1, \ldots N-1$ of the transversal desmearing filter comprising $N-1$ delay elements is formed wholly from elements of the set $-1, 0, +1$.

2. A data transmission system as claimed in claim 1, characterized in that for a given value of the intersymbol interference caused by the cascade arrangement of the transversal smearing filter and transversal desmearing filter, the sequence of coefficients $b_d(n)$ is chosen such that for a given output power of the transmitter and a given total gain of the transmission system, a substantially maximum value of a first merit factor $F_1$, which is defined by:

$$F_1 = \frac{\max_n |(\tilde{p} * g)(n)|}{\max_n |(\tilde{p} * \tilde{b}_d * g)(n)|} \quad n = 0, 1, \ldots (N-1)$$

where $\tilde{p}(n) = p(n)e^{-jn\theta_c}$, $\tilde{b}(n) = b(n)e^{-jn\theta_c}$, where $\theta_c$ represents a given modulation angular frequency, $p(n)$ represents the sampling value of any random noise pulse introduced in the transmission path and $g(n)$ is the impulse response of the filter action, reconverted to the zero frequency, of the receiver without desmearing filter is obtained.

3. A data transmission receiver as claimed in claim 2, characterized in that the intersymbol interference of the cascade arrangement of the smearing filter and the desmearing filter is proportional to a second merit factor $F_2$ equal to $$F_2 = \frac{\max_n |h(n)|}{\sqrt{\sum_n |\mu(n)|^2}}$$

wherein $\mu(n) = h'(n) - h(n)$, where $h(n)$ is the overall equivalent impulse response of the transmission system without the presence of the smearing filter and the desmearing filter and $h'(n)$ the overall equivalent impulse response of the transmission system with the smearing filter and the desmearing filter, and that optimization of the first merit factor $F_1$ is determined for a predetermined lower limit of this second merit factor $F_2$.

4. A data transmission system as claimed in any of the preceding claims, for baseband signals, characterized in that the smearing filter comprises $M-1$ delay elements, where $M \geq N$, and that the coefficients $b_s(m)$, $m = 0, 1, 2, \ldots M-1$ of this filter are defined by $$b_s = (\phi_{bd}^{-1} b_d / b_d^T \phi_{bd}^{-1} b_d)$$

where
$b_d = (0,0 \ldots 0, b_d(0), b_d(1), \ldots b_d(N-1), 0,0 \ldots 0)^T$
$b_s = (b_s(0), b_s(1) \ldots, b_s(M-1), b_s(M-1))^T$ $$\phi_{bd} = \begin{pmatrix} \phi_{bd}(0) & \phi_{bd}(1) & \ldots & \phi_{bd}(M-1) \\ \phi_{bd}(1) & & & \phi_{db}(M-2) \\ \vdots & & & \vdots \\ \phi_{bd}(M-1) & & \ldots & \phi_{bd}(0) \end{pmatrix}$$

and $$\phi_{bd}(m) = \sum_n b_d(n) b_d(n+m).$$

5. A data transmission system as claimed in any of the claims 1 to 3 for modulation band signals, characterized in that for the sequence of coefficients $b_s(n)$, where $n = 0, 1, \ldots (N-1)$, of the smearing filter having $(N-1)$ delay elements, it holds that $$b_s(n) = b_d(N_o - n)$$

for any random value of $N_o$ and for all values of $n$.

6. A smearing filter having $(M-1)$ delay elements for use in a data transmission system for baseband signals as claimed in claim 1, the transmission system comprising a desmearing filter with a sequence of coefficients $b_d(n)$, $n = 0, 1, \ldots N-1$, formed by elements of the set $+1, 0, -1$, characterized in that the coefficients $b_s(m)$, where $m = 0, 1, 2, \ldots M-1$ and $M \geq N$ are defined by $$b_s = (\phi_{bd}^{-1} b_d / b_d^T \phi_{bd}^{-1} b_d)$$

where $$\underline{b}_d = (0,0, \ldots 0, b_d(0), b_d(1), \ldots b_d(N-1), 0,0, \ldots 0)^T$$

$(M-N)/2 \qquad\qquad (M-N)/2$ $$b_s = (b_s(0), b_s(1), \ldots b_s(M-2), b_s(M-1))^T$$

$$\phi_{bd} = \begin{pmatrix} \phi_{bd}(0) & \phi_{bd}(1) & \ldots & \phi_{bd}(M-1) \\ \phi_{bd}(1) & \phi_{bd}(2) & & \phi_{bd}(M-2) \\ \vdots & & & \vdots \\ \phi_{bd}(M-1) & \phi_{bd}(M-2) & \ldots & \phi_{bd}(0) \end{pmatrix}$$

and $\phi_{bd}(m) = \sum_n b_d(n) b_d(n+m).$

* * * * *